United States Patent
Sasaki et al.

(10) Patent No.: US 11,943,243 B2
(45) Date of Patent: Mar. 26, 2024

(54) ANOMALY DETECTION METHOD AND ANOMALY DETECTION DEVICE

(71) Applicant: Panasonic Intellectual Property Corporation of America, Torrance, CA (US)

(72) Inventors: Takamitsu Sasaki, Osaka (JP); Tomoyuki Haga, Nara (JP); Daiki Tanaka, Hiroshima (JP); Makoto Yamada, Kyoto (JP); Hisashi Kashima, Kyoto (JP); Takeshi Kishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 435 days.

(21) Appl. No.: 17/322,371

(22) Filed: May 17, 2021

(65) Prior Publication Data

US 2021/0273966 A1 Sep. 2, 2021

Related U.S. Application Data

(63) Continuation of application No. PCT/JP2020/012301, filed on Mar. 19, 2020.

(30) Foreign Application Priority Data

Mar. 29, 2019 (JP) ................. 2019-067627

(51) Int. Cl.
*G06F 11/00* (2006.01)
*G06F 12/14* (2006.01)
(Continued)

(52) U.S. Cl.
CPC .......... *H04L 63/1425* (2013.01); *H04L 12/40* (2013.01); *H04L 63/1466* (2013.01);
(Continued)

(58) Field of Classification Search
CPC .. H04L 63/1425; H04L 63/1466; H04L 12/40
(Continued)

(56) References Cited

U.S. PATENT DOCUMENTS 4,656,532 A 4/1987 Greenberg et al.
2018/0314571 A1* 11/2018 Tanabe ................ H04L 63/1425
(Continued)

FOREIGN PATENT DOCUMENTS

JP 06-042302 6/1994
JP 2018-160078 10/2018
(Continued)

OTHER PUBLICATIONS

Konrad Rieck et al. Visualization and Explanation of Payload-Based Anomaly Detection, 2009, European Conference on computer Network Defense, pp. 29-36 (Year: 2009).*
(Continued)

*Primary Examiner* — Jeffrey C Pwu
*Assistant Examiner* — Samuel Ambaye
(74) *Attorney, Agent, or Firm* — Greenblum & Bernstein, P.L.C.

(57) ABSTRACT

In an anomaly detection method that determines whether each frame in observation data constituted by a collection of frames sent and received over a communication network system is anomalous, a difference between a data distribution of a feature amount extracted from the frame in the observation data and a data distribution for a collection of frames sent and received over the communication network system, obtained at a different timing from the observation data, is calculated. A frame having a feature amount for which the difference is predetermined value or higher is determined to be an anomalous frame. An anomaly contribution level of feature amounts extracted from the frame determined to be an anomalous frame is calculated, and an anomalous payload part, which is at least one part of the payload corresponding to the feature amount for which the anomaly contribution level is at least the predetermined value, is output.

11 Claims, 11 Drawing Sheets

(51) Int. Cl.
G06F 12/16 (2006.01)
G08B 23/00 (2006.01)
H04L 9/40 (2022.01)
H04L 12/40 (2006.01)

(52) U.S. Cl.
CPC .............. *H04L 2012/40215* (2013.01); *H04L 2463/142* (2013.01)

(58) Field of Classification Search
USPC .......................................................... 726/23
See application file for complete search history.

(56) References Cited

U.S. PATENT DOCUMENTS

2019/0116157 A1   4/2019   Kishikawa et al.
2019/0140778 A1   5/2019   Kishikawa et al.

FOREIGN PATENT DOCUMENTS

WO   2018/105330   6/2018
WO   2018/168291   9/2018

OTHER PUBLICATIONS

Extended European Search Report (EESR) from European Patent Office (EPO) in European Patent Application No. 20782439.2, dated Apr. 8, 2022.
Konrad Rieck et al., "Visualization and Explanation of Payload-Based Anomaly Detection", 2009 European Conference on Computer Network Defense (EC2ND), IEEE, Piscataway, NJ, USA, Nov. 9, 2009 (Nov. 9, 2009), pp. 29-36, XP031696466.
Konrad Rieck: "Machine Learning for Application-Layer Intrusion Detection", Thesis Tu Berlin, Jul. 6, 2009 (Jul. 6, 2009), pp. 1-151, XP007913622.
International Search Report (ISR) from International Searching Authority (Japan Patent Office) in International Pat. Appl. No. PCT/JP2020/012301, dated Jun. 16, 2020, along with an English language translation thereof.

* cited by examiner

FIG. 4

| Time of occurrence | 1/15/2020 13:15 | |
|---|---|---|
| Model | A | |
| Attack level | High | |
| Anomaly detection ID | 0x100 | 0x200 |
| Attack type | Sensor value spoof | State value spoof |
| Anomalous part | 1-15 Bits | 33-36 Bits |

FIG. 5

| CAN ID | Payload value (hexadecimal) | Frequency |
|---|---|---|
| 0x100 | 00 00 00 00 00 00 00 00 | 10 |
| | 00 00 00 00 00 00 00 11 | 22 |
| | ⋮ | ⋮ |
| | 00 FF 00 00 00 00 00 00 | 10000 |
| | 00 FF 00 88 88 00 00 11 | 8000 |
| 0x200 | FF 00 FF FF 00 00 00 88 | 50 |
| | ⋮ | ⋮ |
| ⋮ | ⋮ | ⋮ |

FIG. 6

| Anomalous part length (bits) | Attack type |
|---|---|
| 1-4 | State value spoof |
| 8-31 | Sensor value spoof |
| 32 ≤ | Trial attack |

FIG. 7

| First condition | Second condition | Attack level |
|---|---|---|
| Anomaly with single ID | Only trial attack | Low |
| Anomaly with plurality of IDs | | |
| Anomaly with single ID | Other than trial attack | Mid |
| Anomaly with plurality of IDs | Single attack type (or other than trial attack) and same anomalous part | |
| Anomaly with plurality of IDs | Combination of different attack types or different anomalous parts | High |

| CAN ID | Payload value (hexadecimal) | Frequency |
|---|---|---|
| 0x100 | 00 FF 00 00 00 00 00 22 | 4 |
|  | 00 FF 00 00 00 00 00 11 | 6 |
|  | 00 FF 00 00 00 00 00 00 | 10 |
| 0x200 | FF 00 FF FF 00 00 00 88 | 3 |
|  | FF 00 FF F0 00 00 00 F0 | 2 |
| 0x300 | 55 00 FF 00 33 00 11 E4 | 3 |
| ⋮ | ⋮ | ⋮ |

ANOMALY DETECTION METHOD AND ANOMALY DETECTION DEVICE

CROSS REFERENCE TO RELATED APPLICATIONS

This is a continuation application of PCT International Application No. PCT/JP2020/012301 filed on Mar. 19, 2020, designating the United States of America, which is based on and claims priority of Japanese Patent Application No. 2019-067627 filed on Mar. 29, 2019. The entire disclosures of the above-identified applications, including the specifications, drawings and claims are incorporated herein by reference in their entirety.

FIELD

The present disclosure relates to a technique for detecting an anomalous frame in a collection of frames flowing in a communication network system.

BACKGROUND

In recent years, many devices called electronic control units ("ECUs" hereinafter) are being installed in systems in automobiles. A communication network which connects these ECUs is called an "in-vehicle network". There are many standards for in-vehicle networks, but of these, one of the most mainstream standards is Controller Area Network ("CAN" hereinafter).

CAN does not define security functions for cases in which an improper frame is transmitted. As such, if no countermeasures are taken, it is possible, for example, for a node hijacked by an attacker to improperly control a vehicle by transmitting improper frames to the CAN bus.

PTL 1 discloses a method of uploading information pertaining to frames transmitted to an in-vehicle network to a fraud detection server and calculating a degree of anomaly of the frames in the fraud detection server. PTL 2 discloses a method for calculating a degree of anomaly in communication by extracting a feature amount from a communication log of an in-vehicle network and comparing the extracted feature amount with a normal model.

CITATION LIST

Patent Literature

PTL 1: Japanese Patent No. 642302
PTL 2: Japanese Unexamined Patent Application Publication No. 2018-160078

SUMMARY

Technical Problem

The methods disclosed in PTL 1 and PTL 2 only calculate the degree of anomaly in a frame or communication, and do not provide more detailed information that can be used, for example, to respond quickly to an anomaly caused by an attack.

Accordingly, the present disclosure provides an anomaly detection method and an anomaly detection device that detect an anomalous frame included in frames flowing in a communication network such as an in-vehicle network, and then output more detailed information that can be used to respond quickly to an anomaly caused by an attack and the like.

Solution to Problem

An anomaly detection method according to one aspect of the present disclosure is an anomaly detection method that, in a communication network system, determines whether each of frames, which are contained in observation data constituted by a collection of frames transmitted and received over the communication network system and observed in a predetermined period, is anomalous, and outputs an anomalous part of a payload in a frame determined to be anomalous. The anomaly detection method includes obtaining a data distribution of a plurality of feature amounts pertaining to a part of the payload included in the frame, the part being at least one bit, detecting whether or not the frame contained in the observation data is anomalous, and outputting the anomalous part. In the obtaining, the data distribution is obtained for a collection of frames that are sent and received over the communication network system, the collection being obtained at a different timing from a timing at which the observation data is obtained. In the detecting, a difference between the data distribution obtained in the obtaining and a data distribution of a feature amount extracted from the frame contained in the observation data is calculated, and the frame is determined to be an anomalous frame when the frame has a feature amount for which the difference is at least a predetermined value. In the outputting, when a frame determined to be an anomalous frame in the detecting is present, an anomaly contribution level is calculated for the plurality of feature amounts that have been extracted from the anomalous frame, and an anomalous payload part is output, the anomalous payload part being at least one part in the payload that corresponds to a feature amount for which the anomaly contribution level is at least a predetermined value.

Additionally, an anomaly detection device according to one aspect of the present disclosure is an anomaly detection device that, in a communication network system, determines whether a frame, which is contained in observation data constituted by a collection of frames transmitted and received over the communication network system and observed in a predetermined period, is anomalous, and outputs an anomalous part of a payload in a frame determined to be anomalous. The anomaly detection device includes: a reference model holder that holds a data distribution of a plurality of feature amounts pertaining to a part of the payload included in the frame, the part being at least one bit; an anomaly detector that determines whether or not the frame contained in the observation data is anomalous; and an anomalous part outputter that, when the anomaly detector has detected an anomalous frame, calculates an anomaly contribution level for the plurality of feature amounts that have been extracted from the anomalous frame, and outputs an anomalous payload part, the anomalous payload part being at least one part contained in the frame and corresponding to a feature amount for which the anomaly contribution level is at least a predetermined value. The reference model holder holds the data distribution for a collection of frames that are sent and received over the communication network system, the collection being obtained at a different timing from a timing at which the observation data is obtained. The anomaly detector calculates a difference between the data distribution held by the reference model holder and a data distribution of a feature amount extracted from the frame contained in the observation data, and determines that the frame is an anomalous frame when the frame has a feature amount for which the difference is at least a predetermined value.

Note that these comprehensive or specific aspects may be realized by a system, a method, an integrated circuit, a computer program, or a computer-readable recording medium such as a CD-ROM, or may be implemented by any desired combination of devices, systems, methods, integrated circuits, computer programs, and recording media.

Advantageous Effects

The anomaly detection method and the anomaly detection device according to the present disclosure detect an anomalous frame included in frames flowing in a communication network such as an in-vehicle network, and then output more detailed information that can be used to respond quickly to an anomaly and the like.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4 is a diagram illustrating an example of a result of determining details of an attack according to the embodiment.

FIG. 5 is a diagram illustrating an example of a normal data distribution model held in a reference model holder included in the aforementioned anomaly detection server.

FIG. 6 is a diagram illustrating an example of an attack type determination table included in the aforementioned anomaly detection server.

FIG. 7 is a diagram illustrating an example of an attack level determination table included in the aforementioned anomaly detection server.

Figure 1:
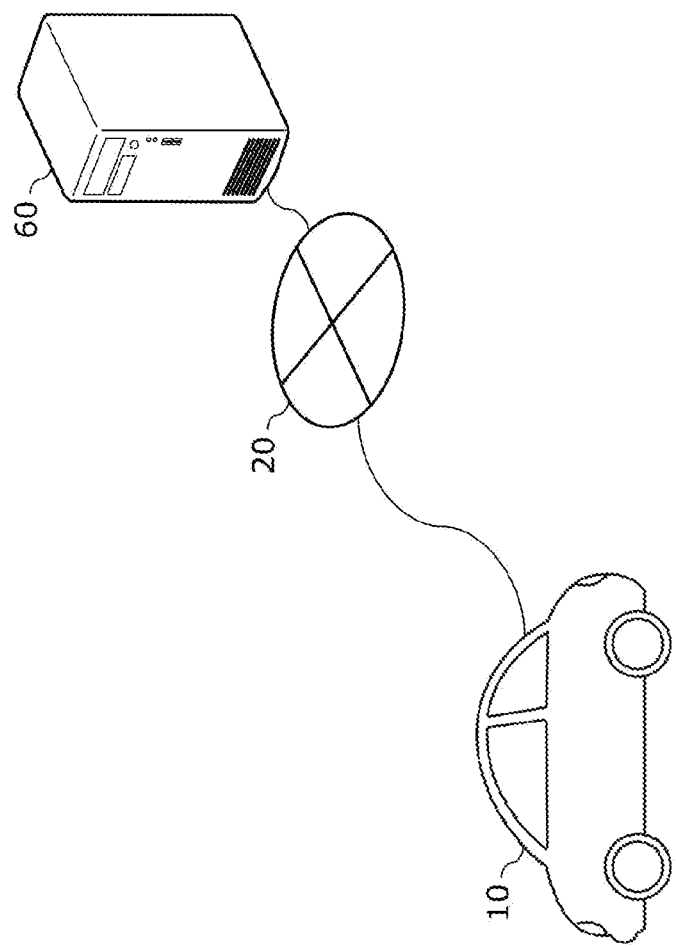
FIG. 1 is a diagram illustrating an overview of an in-vehicle network anomaly detection system according to an embodiment.

DESCRIPTION OF EMBODIMENTS (Underlying Knowledge Forming Basis of the Present Disclosure)

When an anomaly occurs in a communication network, it is important not only to specify an anomalous frame contained in frames that have been transmitted, but also to understand the details of the anomaly and respond appropriately and quickly according to the details in order to prevent or minimize damage. Here, the "details of the anomaly" are, for example, the location of the anomaly in the frame, a conceivable cause of the anomaly, and a danger level of the anomaly. However, when using the past methods described in the Background Art section, even if the degree of anomaly of the frame or communication can be understood, information on the details of the anomaly, mentioned here, cannot be obtained.

An anomaly detection method according to one aspect of the present disclosure, conceived of in order to solve such a problem, is an anomaly detection method that, in a communication network system, determines whether each of frames, which are contained in observation data constituted by a collection of frames transmitted and received over the communication network system and observed in a predetermined period, is anomalous, and outputs an anomalous part of a payload in a frame determined to be anomalous. The anomaly detection method includes obtaining a data distribution of a plurality of feature amounts pertaining to a part of the payload included in the frame the part being at least one bit, detecting whether or not the frame contained in the observation data is anomalous, and outputting the anomalous part. In the obtaining, the data distribution is obtained for a collection of frames that are sent and received over the communication network system, the collection being obtained at a different timing from a timing at which the observation data is obtained. In the detecting, a difference between the data distribution obtained in the obtaining and a data distribution of a feature amount extracted from the frame contained in the observation data is calculated, and the frame is determined to be an anomalous frame when the frame has a feature amount for which the difference is at least a predetermined value. In the outputting, when a frame determined to be an anomalous frame in the detecting is present, an anomaly contribution level is calculated for the plurality of feature amounts that have been extracted from the anomalous frame, and an anomalous payload part is output, the anomalous payload part being at least one part in the payload that corresponds to a feature amount for which the anomaly contribution level is at least a predetermined value.

Through this, not only are anomalous frames detected from a large number of frames being transmitted and received on the communication network, but information pertaining to anomalous parts of the payloads in the frames is obtained as well. Using the details of the anomaly identified in this manner makes it possible to respond more quickly and appropriately to the anomaly.

Additionally, the anomaly detection method may further include determining an anomaly type, wherein in the determining of an anomaly type, an anomalous payload part length is specified based on the anomalous payload part, and the anomaly type is determined according to the anomalous payload part length.

Through this, information pertaining to what type of anomaly has occurred is obtained with respect to the anomalous frame that has been detected. Using the additional details of the anomaly identified in this manner makes it possible to respond more quickly and appropriately to the anomaly.

Additionally, in the determining of an anomaly type, the anomaly type may be determined to be a state value anomaly when the anomalous payload part length is within a first range, a sensor value anomaly when the anomalous payload part length is within a second range greater than the first range, and a trial attack anomaly when the anomalous payload part length is within a third range longer than the second range. For example, the first range may be a range having an upper limit of no greater than 4 bits, the second range may be a range having a lower limit of at least 8 bits and an upper limit of no greater than 16 bits, and the third range may be a range having a lower limit of 32 bits.

In this manner, the type of the anomaly, which is a detail of the anomaly, can be determined based on the bit length of the anomalous part. Using the details of the anomaly identified in this manner makes it possible to respond more quickly and appropriately to the anomaly.

Additionally, the anomaly detection method may further include determining an anomaly level, wherein in the determining of an anomaly level, the anomaly level is determined to be higher when a plurality of types of frames have been determined to be anomalous in the detecting and the anomalous payload part output in the outputting differs among the plurality of types of frames than when the anomalous payload part is the same among the plurality of types of frames.

Through this, the level of danger of the anomaly (the danger level) can be determined from the type of the frame determined to be anomalous and information pertaining to the part of the payload that contributes to the anomaly in the frame. By using the details of the anomaly identified in this manner, when, for example, a plurality of anomalies have occurred, a response that is more appropriate in terms of safety can be carried out, i.e., prioritizing the response to an anomaly having a higher danger level.

Additionally, the anomaly detection method may further include determining an anomaly level, wherein in the determining of an anomaly level, the anomaly level is determined to be higher than when a plurality of types of frames have been determined to be anomalous in the detecting and the anomaly type determined in the determining of an anomaly type is the same among the plurality of types of frames.

Through this, the danger level of an anomaly can be determined from a combination of the number of types of frames determined to be anomalous on the communication network and the number of types of anomalies occurring in the frames. By using the details of the anomaly identified in this manner, when, for example, a plurality of anomalies have occurred, a response that is more appropriate in terms of safety can be carried out, i.e., prioritizing the response to an anomaly having a higher danger level.

Additionally, the anomaly detection method may further include determining an anomaly level, wherein in the determining of an anomaly level, the anomaly level is determined to be lower when at least one type of frame has been determined to be anomalous in the detecting and the anomaly type determined in the determining of an anomaly type is only a trial attack anomaly than when the anomaly type determined does not include the trial attack anomaly.

Through this, it can be determined, from the type of the anomaly that has occurred, whether or not the anomaly has a low danger level. By using the details of the anomaly identified in this manner, when, for example, a plurality of anomalies have occurred, a response that is more appropriate in terms of safety can be carried out, i.e., prioritizing the response to an anomaly having a higher danger level. Additionally, when the danger level is low, restrictions on the functionality of the communication network system, made as a response to the anomaly, can be loosened, which makes it possible to reduce the convenience sacrificed for the user.

Additionally, the anomaly detection method may further include determining an anomaly level, wherein in the determining of an anomaly level, when at least one type of frame has been determined to be anomalous in the detecting, the anomaly level is determined based on a predetermined formula that takes, as a parameter, at least one of the type of the frame determined to be anomalous, a number of types of frames determined to be anomalous, the anomalous payload part output in the outputting, and the anomaly type determined in the determining of an anomaly type.

Through this, the danger level of an anomaly can be determined from a plurality of conditions pertaining to the details of an anomaly in a frame detected as being anomalous. By using the details of the anomaly identified in this manner, when, for example, a plurality of anomalies have occurred, a response that is more appropriate in terms of safety can be carried out, i.e., prioritizing the response to an anomaly having a higher danger level.

Additionally, in the determining of an anomaly type, when a plurality of the anomalous payload parts are included in a single frame and a number of intermediate bits between the plurality of the anomalous payload parts is no greater than a predetermined standard, the anomalous payload part and the intermediate bits may be collectively treated as a single anomalous payload part.

This increases the likelihood of more accurately determining the anomaly type based on the anomalous part length in the payload in the frame determined to be anomalous.

Additionally, the communication network system may be an in-vehicle network system.

Through this, a large number of frames transmitted and received in the in-vehicle network system can be monitored, and anomalous frames included therein can be detected; furthermore, the details of an anomaly can be understood, and an appropriate response can be taken more quickly. This makes it possible to improve the safety of the automobile.

Additionally, an anomaly detection device according to one embodiment of the present disclosure is an anomaly detection device that, in a communication network system, determines whether a frame, which is contained in observation data constituted by a collection of frames transmitted and received over the communication network system and observed in a predetermined period, is anomalous, and outputs an anomalous part of a payload in a frame determined to be anomalous. The anomaly detection device includes: a reference model holder that holds a data distribution of a plurality of feature amounts pertaining to a part of the payload included in the frame, the part being at least one bit; an anomaly detector that determines whether or not the frame contained in the observation data is anomalous; and an anomalous part outputter that, when the anomaly detector has detected an anomalous frame, calculates an anomaly contribution level for the plurality of feature amounts that have been extracted from the anomalous frame, and outputs an anomalous payload part, the anomalous payload part being at least one part contained in the frame and corresponding to a feature amount for which the anomaly contribution level is at least a predetermined value. The reference model holder holds the data distribution for a collection of frames that are sent and received over the communication network system, the collection being obtained at a different timing from a timing at which the observation data is obtained. The anomaly detector calculates a difference between the data distribution held by the reference model holder and a data distribution of a feature amount extracted from the frame contained in the observation data, and determines that the frame is an anomalous frame when the frame has a feature amount for which the difference is at least a predetermined value.

Through this, not only are anomalous frames detected from a large number of frames being transmitted and received on the communication network, but information pertaining to anomalous parts of the payloads in the frames is obtained as well. Using the details of the anomaly identified in this manner makes it possible to respond more quickly and appropriately to the anomaly.

Note that these comprehensive or specific aspects may be realized by a system, a method, an integrated circuit, a computer program, or a computer-readable recording medium such as a CD-ROM, or may be implemented by any desired combination of devices, systems, methods, integrated circuits, computer programs, and recording media.

Embodiments of an anomaly detection method and an anomaly detection device according to the present disclosure will be described hereinafter with reference to the drawings. Note that the following embodiments describe comprehensive or specific examples of the present disclosure. The numerical values, shapes, materials, constituent elements, arrangements and connection states of constituent elements, steps, orders of steps, and the like described in the following embodiments are provided only for exemplary purposes, and are not intended to limit the present disclosure.

Embodiment

The following will describe a method for detecting an anomalous frame mixed in with frames transmitted and received in a communication network system, specifying an anomalous part in the frame, and determining the type and danger level of the anomaly. These descriptions will use, as an example, an in-vehicle network anomaly detection system including a vehicle and a server, the vehicle being provided with an in-vehicle network system in which a plurality of electronic control units (ECUs) communicate over a network configured using a CAN bus, and the server detecting an anomalous frame.

1.1 Overview of In-Vehicle Network Anomaly Detection System

FIG. 1 is a diagram illustrating an overview of the in-vehicle network anomaly detection system according to the present embodiment. An in-vehicle network anomaly detection system is configured by connecting anomaly detection server 60 and vehicle 10 over network 20, which serves as a communication path. Network 20 can include the Internet or a dedicated line. The in-vehicle network system provided in vehicle 10 includes a plurality of ECUs that communicate over an in-vehicle bus (a CAN bus). These ECUs are connected to various types of devices in the vehicle, such as control devices, sensors, actuators, user interface devices, and the like.

In the present embodiment, each ECU in the in-vehicle network system communicates according to the CAN protocol. Types of frames in the CAN protocol include data frames, remote frames, overload frames, and error frames. Here, the descriptions will focus mainly on data frames. The CAN protocol defines a data frame as including a data field that stores data, a DLC (Data Length Code) that indicates the data length of the data field, and an ID field that stores an ID indicating the type based on the data stored in the data field. Note that the anomaly detection method or the anomaly detection device according to the present embodiment can also be applied in an communication network system that uses a CAN protocol frame type aside from data frame, or uses a different communication protocol entirely.

1.2 Configuration of In-Vehicle Network System

Figure 2:
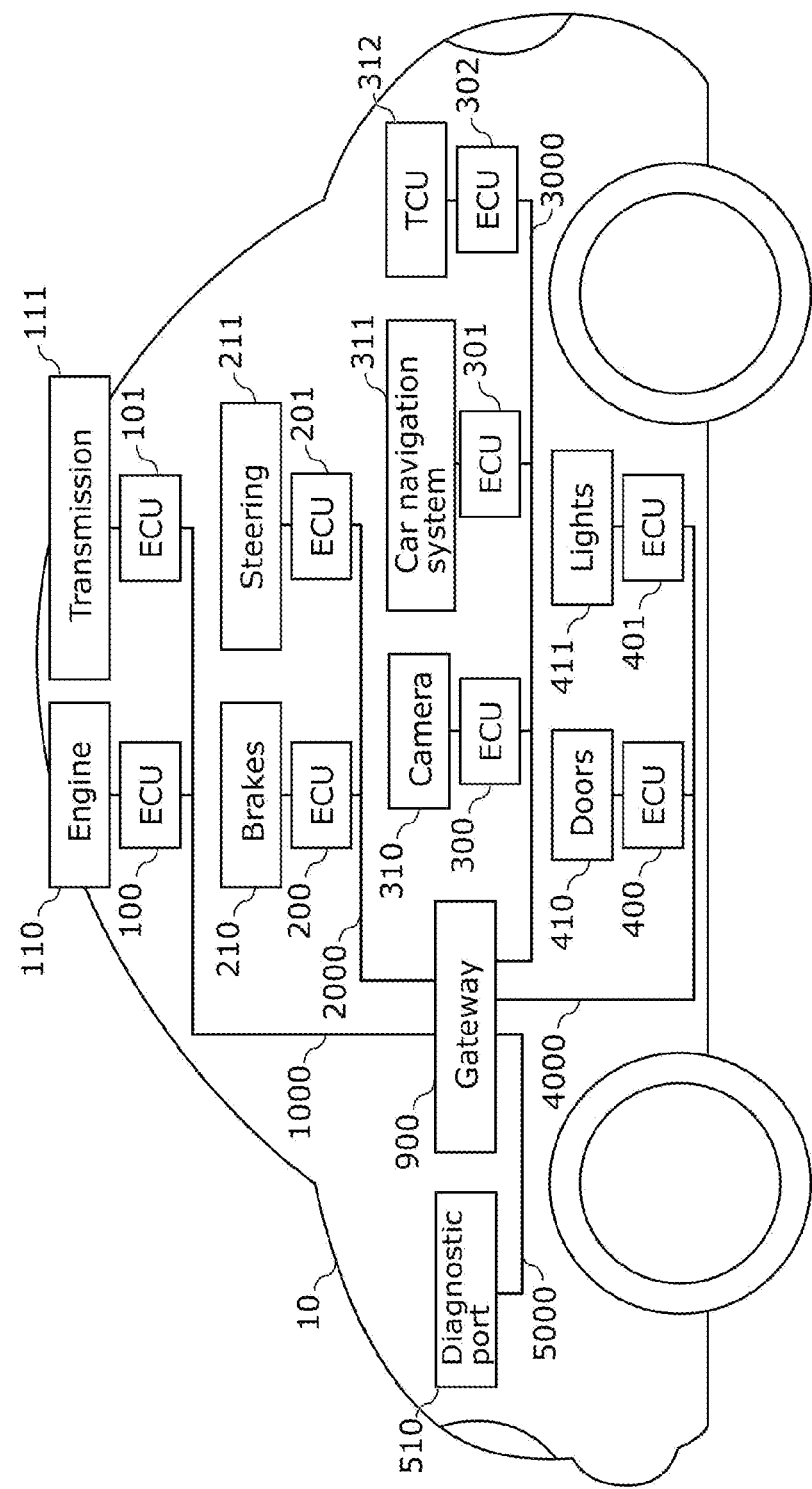
FIG. 2 is a diagram illustrating the overall configuration of an in-vehicle network system according to the embodiment.

FIG. 2 is a diagram illustrating an example of the configuration of the in-vehicle network system provided in vehicle 10.

The in-vehicle network system in vehicle 10 includes nodes such as a plurality of ECUs (ECUs 100, 101, 200, 201, 300, 301, 302, 400, 401) connected to buses (CAN buses) 1000, 2000, 3000, 4000 and 5000, as well as gateway 900 that relays communication among these buses. Note that gateway 900 is also an ECU.

Although not illustrated in FIG. 2, the in-vehicle network system can include many more ECUs. An ECU is a device that includes, for example, a processor (a microprocessor), digital circuits such as memory, analog circuits, communication circuits, and the like. The memory is ROM (Read-Only Memory) and RAM (Random Access Memory), which can store a control program (computer program) executed by the processor. For example, the processor realizes various functions of the ECU by operating in accordance with the control program. Note that the computer program is a combination of a plurality of command codes for the processor to realize a predetermined function.

Powertrain system ECUs pertaining to driving vehicle 10, such as controlling a motor, fuel, a battery, and the like, are connected to bus 1000. ECU (engine ECU) 100 connected to engine 110 and ECU (transmission ECU) 101 connected to transmission 111 are examples of the powertrain system ECUs in the present embodiment.

Chassis system ECUs relating to the control of steering and braking of vehicle 10, such as "turning", "stopping", and the like, are connected to bus 2000. ECU (brake ECU) 200 connected to brakes 210 and ECU (steering ECU) 201 connected to steering 211 are examples of the chassis system ECUs in the present embodiment.

ECUs related to information systems, such as functions that recognize, determine, and control driving assistance based on image information, functions related to an audio head unit, and vehicle-to-vehicle communication, are connected to bus 3000. ECU 300, ECU 301, and ECU 302, which are connected to camera 310, car navigation system 311, and telematics control unit (TCU) 312, respectively, are examples of the ECUs related to information systems in the present embodiment.

Body system ECUs related to control of vehicle equipment such as doors, air conditioning, blinkers, and the like are connected to bus 4000. ECU 400 connected to doors 410 and ECU 401 connected to lights 411 are examples of the body system ECUs in the present embodiment.

Diagnostic port 510, which is an interface for communicating with an external diagnostic tool (fault diagnostic tool), such as OBD2 (On-Board Diagnostics second generation), is connected to bus 5000.

Each of the above-described ECUs (ECU 100, 200, and the like) obtains information indicating a state of the connected device (engine 110, brakes 210, and the like), and periodically transmits a data frame and the like expressing that state (data frames may be referred to simply as "frames" hereinafter) to the in-vehicle network system, i.e., to the CAN bus.

Gateway 900 is an ECU that transfers data among a plurality of different communication paths. To describe this with reference to the example in FIG. 2, gateway 900 is connected to bus 1000, bus 2000, bus 3000, bus 4000, and bus 5000. In other words, gateway 900 is an ECU having a function of transferring frames received from one bus to another bus under set conditions (i.e., a destination bus selected according to the conditions).

ECU 302 has a function of receiving and holding frames flowing in bus 3000 and periodically uploading those frames to anomaly detection server 60. The frames are uploaded from TCU 312 to anomaly detection server 60 over network 20, which includes a communication line such as a mobile phone line or the like.

1.3 Configuration of Anomaly Detection Server

Figure 3:
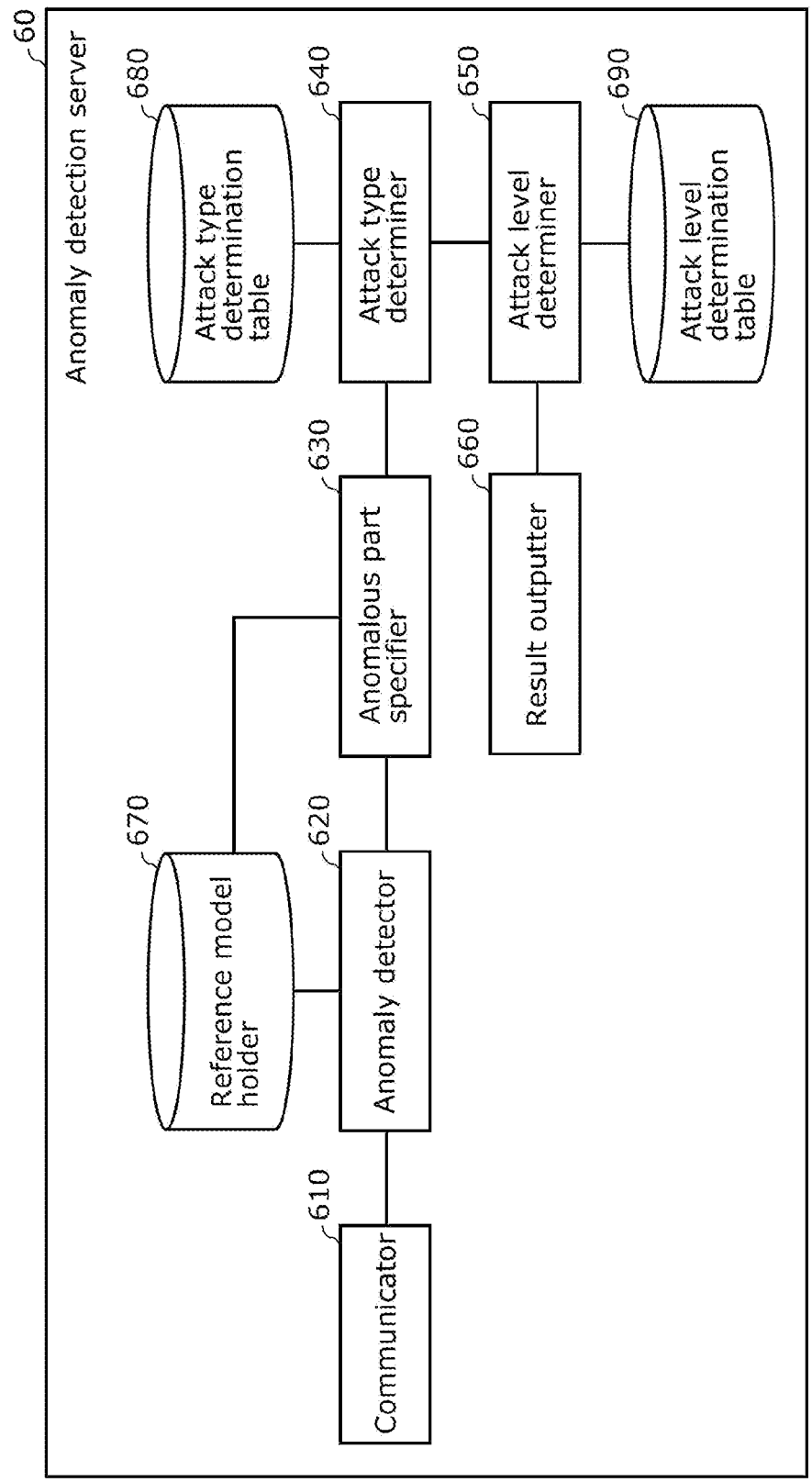
FIG. 3 is a block diagram illustrating the functional configuration of an anomaly detection server included in the aforementioned in-vehicle network anomaly detection system.

FIG. 3 is a block diagram illustrating the functional configuration of server (anomaly detection server) 60. Anomaly detection server 60, which is for handling an improper frame transmitted over the in-vehicle network system of vehicle 10, is implemented by, for example, at least one computer including a processor, memory, a communication interface, and the like. Anomaly detection server 60 includes communicator 610, anomaly detector 620, anomalous part specifier 630, attack type determiner 640, attack level determiner 650, result outputter 660, reference model holder 670, attack type determination table 680, and attack level determination table 690.

The functions of reference model holder 670, attack type determination table 680, and the attack level determination table 690 can be realized by data held in a predetermined configuration in a storage medium such as memory or a hard disk, for example. These data will be described later using examples.

Additionally, the functions of anomaly detector 620, anomalous part specifier 630, attack type determiner 640, attack level determiner 650, and result outputter 660 can be realized by a processor executing a control program stored in memory, for example.

Communicator 610 is realized by a communication interface, a processor that executes a control program stored in memory, and the like. Communicator 610 receives information pertaining to the in-vehicle network system of vehicle 10 by communicating with vehicle 10 over network 20. The information pertaining to the in-vehicle network system can include, for example, the details of frames flowing in the CAN buses of the in-vehicle network system (payload information) and information pertaining to reception timings (intervals, frequencies, and the like).

Anomaly detector 620 determines whether data (observation data set D') of a log of the in-vehicle network system, communicated from communicator 610, is anomalous. At this time, an in-vehicle network log during normal travel (reference model data set D), held in reference model holder 670, is referenced, and it is determined whether or not the observation data set D' contains data of an anomalous frame based on a difference between the observation data set D' and the reference model data set D.

An anomaly detection method performed by density ratio estimation, for example, can be used to determine whether observation data set D' is anomalous. Density ratio estimation is a technique to detect locations where a distribution of reference model data set D differs from a distribution of observation data set D'. For example, an anomaly caused by an attack using a data frame that does not contain an outlier is difficult to detect with methods that use only outlier detection. However, this technique can detect even this kind of anomaly based on a difference in the distribution of values from normal data.

An example of the density ratio estimation algorithm will be described below. The density ratio estimation algorithm trains a classifier to classify normal data and observation data by setting a label of the data of each data frame during normal travel, which constitutes reference model data set D, to 0, and setting a label of the data of each data frame in observation data set D' to 1. Models such as an MLP (Multi Layer Perceptron), logistic regression, random forest, the k-nearest neighbor method, and the like can be used for the classifier.

When the observation data corresponding to one data frame (described in detail later) is represented by x, density ratio r(x) can be found from Bayes' theorem, using Equation 1 below.

$$r(x)=p_D(x)/p_{D'}(x)=p(x|y=0)/p(x|y=1)=p(y=1)p(y=0|x)/p(y=0)p(y=1|x)$$ (Equation 1)

Here, p(y=1|x) represents a probability that observation data x belongs to observation data set D', and is the output of the classifier. Additionally, p(y=0|x) represents a probability that observation data x belongs to the normal data set (i.e., reference model data set D), and is obtained by subtracting 1 from the output of the classifier. p(y=1) and p(y=0) are ratios of the sizes of the observation data set and reference model data set to the entire data set, respectively.

When the absolute value of r(x) exceeds a predetermined threshold, i.e., when the classifier determines that the probability of observation data x belonging to observation data set D' (or reference model data set D) is high, it is determined that (the data frame corresponding to) observation data x is anomalous. Observation data x is a feature amount extracted from the payload in a single data frame, e.g., a 64-dimensional feature amount in which each bit value of the data field contained in the CAN data frame is one feature.

Note that each feature amount does not have to be a corresponding bit value of the data field, and can be obtained by segmenting the entire data field value at predetermined bit lengths. As such, observation data x may be, for example, a 16-dimensional feature amount taking 16 values obtained by segmenting the values of a 64-bit data field every 4 bits as a single feature amount, or an 8-dimensional feature amount taking 8 values obtained by segmenting the values every 8 bits as a single feature amount. The segmentation need not be performed at bits of a fixed length. For example, feature amounts corresponding to each of sub-fields contained in the payload, each of which has a meaning, may be extracted.

The above-described classifier may be prepared and trained for each of IDs contained in the data frame, or a single classifier may be trained using data frames of a predetermined combination of IDs or data frames of all IDs. Anomaly detector 620 communicates the ID and the feature amount of the data frame determined to be anomalous, and information of the classifier used in the determination, to anomalous part specifier 630.

Based on the information communicated by anomaly detector 620, anomalous part specifier 630 calculates a degree of contribution to the anomaly (also called an "anomaly contribution level" hereinafter) of each feature amount in the payload in the data frame determined to be anomalous (here referring to each feature amount constituting a high-dimensional feature amount extracted from one data frame). Anomaly contribution level $c_i$ of feature amount i is obtained by differentiating density ratio r(x) by input x (see Equation 2).

$$c_i = \delta r(x)/\delta x \quad \text{(Equation 2)}$$

Specifically, the anomaly contribution level is an amount of change in density ratio r(x) when a (bit) inversion or a small change is made to the value of feature amount i. Anomalous part specifier 630 calculates this anomaly contribution level for each feature amount i of the data frame determined to be anomalous, and determines that feature amount i indicating an anomaly contribution level of at least a predetermined threshold is a feature amount that contributes to the anomaly of the data frame in question. Anomalous part specifier 630 then specifies a bit position, in the payload, of the part indicating this feature amount as an anomalous payload part.

In addition to the information communicated from anomaly detector 620, anomalous part specifier 630 communicates the feature amount determined to be contributing to the anomaly and information on the specified anomalous payload part to attack type determiner 640.

Attack type determiner 640 has a function of determining a type of an attack that produced the anomalous frame by referring to the information communicated from anomalous part specifier 630 and attack type determination table 680.

Attack type determiner 640 first specifies an anomalous part length in the payload from the anomalous payload part communicated from anomalous part specifier 630. For example, when a first feature amount, a second feature amount, a third feature amount, and so on correspond to the most significant bit, the second-most significant bit, the third-most significant bit, and so on of the payload, respectively, a range in which the bit positions of the anomalous part are continuous is determined to be the anomalous part contributing to a common anomaly. Then, when the first feature amount to a tenth feature amount are determined to be anomalous payload parts, the 10 bits from bit positions 1 through 10 of the payload are specified as the anomalous part length.

Note that the method of specifying the anomalous part length is not limited to the method described above. For example, when the first feature amount to a fourth feature amount and a sixth feature amount to the tenth feature amount, described above, are anomalous parts, the first feature amount to the tenth feature amount, which include a fifth feature amount, may be handled as one continuous anomalous payload part, and the anomalous part length may be set to 10 bits. Although when the number of bits between two adjacent anomalous payload parts (called "intermediate bits" hereinafter) is 1, the adjacent anomalous payload parts and the intermediate bits are handled together as a single anomalous payload part in this example, the configuration is not limited thereto. The length (number of bits) of the intermediate bits handled as a single anomalous payload part by combining adjacent anomalous payload parts and intermediate bits is a matter of design, which can be determined separately. In other words, the number of bits serving as a reference for intermediate bits to be handled in this manner may be a value greater than 1. Based on the ratio of the number of bits in the intermediate bits to the total number of bits in the plurality of anomalous payload parts and the intermediate bits therebetween, those items may be handled as a single anomalous payload part when the ratio is a predetermined value or lower.

Next, attack type determiner 640 determines an attack type in accordance with the anomalous part length (number of bits). For example, when the anomalous part length is 4 bits or less, attack type determiner 640 determines a "state value spoof", assuming that through the attack, the value has been spoofed or tampered with in the part occupied by a flag indicating a state or a value indicating the state. Additionally, for example, when the anomalous part length is between 5 bits and 31 bits inclusive, attack type determiner 640 determines a "sensor value spoof". Additionally, for example, when the anomalous part length is at least 32 bits, a "trial attack" is determined, which is an exploratory attack performed by injecting a random value, a value based on some analogy, a brute force attack using all possible values, or the like. Attack type determiner 640 executes the above-described determination on the data frames that anomaly detector 620 has determined to be anomalous, which have been communicated from anomalous part specifier 630, in an in-vehicle network log corresponding to data frames observed in the in-vehicle network system at a predetermined time or over a predetermined length of time (also called a "predetermined period" hereinafter when there is no particular need to distinguish between the two), which have been communicated from vehicle 10, and communicates results of a series of determinations of attack types to attack level determiner 650.

Attack level determiner 650 refers to the attack type and attack level determination table 690 communicated from attack type determiner 640; determines an attack level indicating a danger level of the anomaly that has occurred by using a combination of conditions pertaining to the type of data frame in which the anomaly has occurred, conditions pertaining to the anomalous payload part, and conditions pertaining to the attack type that has been determined; and communicates a result of the determination to result outputter 660. In this example, the attack level is determined according to three levels, namely low, mid, and high.

Result outputter 660 outputs the information communicated from attack level determiner 650 in a data format appropriate for the application. For example, to communicate such information to an administrator of the in-vehicle network anomaly detection system as an alert, result outputter 660 outputs image data for displaying the fact that an anomaly has occurred due to an attack on a connected display, as well as the attack level, in the display. Additionally, for example, result outputter 660 may have a configuration enabling part of anomaly detection server 60 to function as a web server that is accessed by the administrator using software for viewing such information (e.g., a general-purpose web browser or dedicated application software). Additionally, for example, result outputter 660 may have a configuration enabling part of anomaly detection server 60 to function as a mail server that communicates such information to the administrator by email. Additionally, for example, result outputter 660 may output such information in a data format for recording on an electronic medium or the like as an incident log. Note that the aforementioned administrator is an example of a notification destination for anomalies occurring in the in-vehicle network system of vehicle 10 from the in-vehicle network anomaly detection system. A security analyst at a security operation center that has been entrusted with monitoring the in-vehicle network system may be another example of the notification destination.

An example of the information output from result outputter 660 is illustrated in FIG. 4. The example illustrated in FIG. 4 indicates that the time at which an anomaly occurred in the in-vehicle network system of a vehicle of model A (or at which an anomaly was detected from the in-vehicle network log) is 13:15 on Jan. 15, 2020. This example further indicates that the attack level of the attack that caused the anomaly is high; the IDs in the frames in which the anomaly was detected, i.e., the types of the data frames, are 0x100 and 0x200; for the data frame with the ID of 0x100, the part of the payload (data field) in bit positions 0 to 15 is an anomalous part caused by sensor value spoofing; and for the data frame with the ID of 0x200, the part of the payload (data field) in bit positions 33 to 36 is an anomalous part caused by state value spoofing.

By receiving a notification of such information, the aforementioned administrator or security analyst can not only prioritize an order in which to respond to each anomaly according to the danger level (attack level, in the above example), but can also determine the details of the response more quickly and appropriately by understanding the type of the attack that is causing the anomaly.

Reference model holder 670 holds a reference model indicating a data distribution of frames transmitted and received in the in-vehicle network system during normal travel of vehicle 10 (this will also be called a "normal data distribution model" hereinafter). The data during normal travel is data obtained at a different timing from the observation data. This data may be, for example, data collected during test travel prior to shipment of vehicle 10 or another vehicle having the same specifications, or may be in-vehicle network data uploaded from vehicle 10, or another vehicle having the same specifications, that is determined not to be under attack. FIG. 5 illustrates an example of the normal data distribution model held in reference model holder 670, and will be described in detail later.

Attack type determination table 680 holds a table for determining the attack type based on the anomalous part length. FIG. 6 illustrates an example of the attack type determination table, and will be described in detail later.

Attack level determination table 690 holds a table for determining the danger level using a combination of conditions pertaining to a number of types of IDs for which an anomaly has occurred, conditions pertaining to the anomalous part of the payload, and conditions pertaining to the attack type that has been determined. FIG. 7 illustrates an example of the attack level determination table, and will be described in detail later.

1.4 Normal Data Distribution Model

FIG. 5 is a diagram illustrating an example of the normal data distribution model held in reference model holder 670 of anomaly detection server 60. As illustrated in FIG. 5, a frequency distribution of payload values is held in the normal data distribution model for each ID of the CAN data frames (see the "CAN ID" column in the drawing).

Specifically, for the data frame having an ID of 0x100, the frequency of a payload value 0x0000000000000000 is 10, the frequency of a payload value 0x0000000000000011 is 22, the frequency of a payload value 0x00FF000000000000 is 10000, and the frequency of a payload value 0x00FF008888000011 is 8000. Additionally, for the data frame having an ID of 0x200, the frequency of a payload value 0xFF00FFFF00000088 is 50.

Although the model illustrated in the example in FIG. 5 is in the form of a frequency distribution that uses an actual measured value of the frequency of the payload value as-is, the model may instead be in the form of a frequency distribution of values normalized for each ID, e.g., relative frequencies. The frequency distribution of normal data may also be held for each of vehicle statuses, such as stopped, traveling, and so on. The model held by reference model holder 670 may also be encrypted.

1.5 Attack Type Determination Table

FIG. 6 is a diagram illustrating an example of the attack type determination table held in attack type determination table 680 of anomaly detection server 60.

According to attack type determination table 680 illustrated in FIG. 6, when the bit length of the anomalous payload part, i.e., the part corresponding to the feature amount contributing to the anomaly in the payload in the data frame (the anomalous part length), is between 1 bit and 4 bits inclusive, attack type determiner 640 determines that the attack type is state value spoofing. Additionally, when the anomalous part length is between 8 bits and 31 bits inclusive, the attack type is determined to be sensor value spoofing, and when the anomalous part length is at least 32 bits, the attack type is determined to be a trial attack.

1.6 Attack Level Determination Table

FIG. 7 is a diagram illustrating an example of the attack level determination table held in attack level determination table 690 of anomaly detection server 60.

According to attack level determination table 690 illustrated in FIG. 7, when there are a plurality of data frames determined to be anomalous, the attack level is determined by combining a first condition pertaining to a number of types of data frames, i.e., whether the data frames have a single ID or a plurality of IDs, and a second condition pertaining to the attack type or the number of attack types and the anomalous payload part (the bit position in the payload).

Regardless of whether there is one ID or a plurality of IDs for the data frame determined to be anomalous, which is the first condition, attack level determiner 650 determines that the attack level is low when the attack type, which is the second condition, is only a trial attack. This is because the attack is likely to have been carried out by an attacker who does not know the vehicle control commands, and has a low impact on the vehicle control.

When there is one ID for the data frame determined to be anomalous, which is the first condition, attack level determiner 650 determines that the attack level is mid when the attack type, which is the second condition, is an attack aside from a trial attack. This is because the attack is likely to have been carried out by an attacker who has identified the type of data frame to be attacked, and is more dangerous due to its impact on vehicle control. Additionally, when there are a plurality of IDs for the data frame determined to be anomalous, which is the first condition, and the attack type, which is the second condition, is one type aside from a trial attack and the anomalous payload parts are the same, the attack level is determined to be mid. This is because the attack is likely to have been carried out by an attacker who has at least identified the part of the data field to be attacked, and the danger level is higher.

When there are a plurality of IDs for the data frame determined to be anomalous, which is the first condition, and a plurality of types of attacks are being carried out in combination or the anomalous part differs for each data frame ID, which is the second condition, the attack level is determined to be high. This is because the attack is likely to be a highly-dangerous attack by an attacker who can spoof or alter the minimum number of data frames required for improper control.

1.7 Configuration of ECUs

Figures 8, 9:
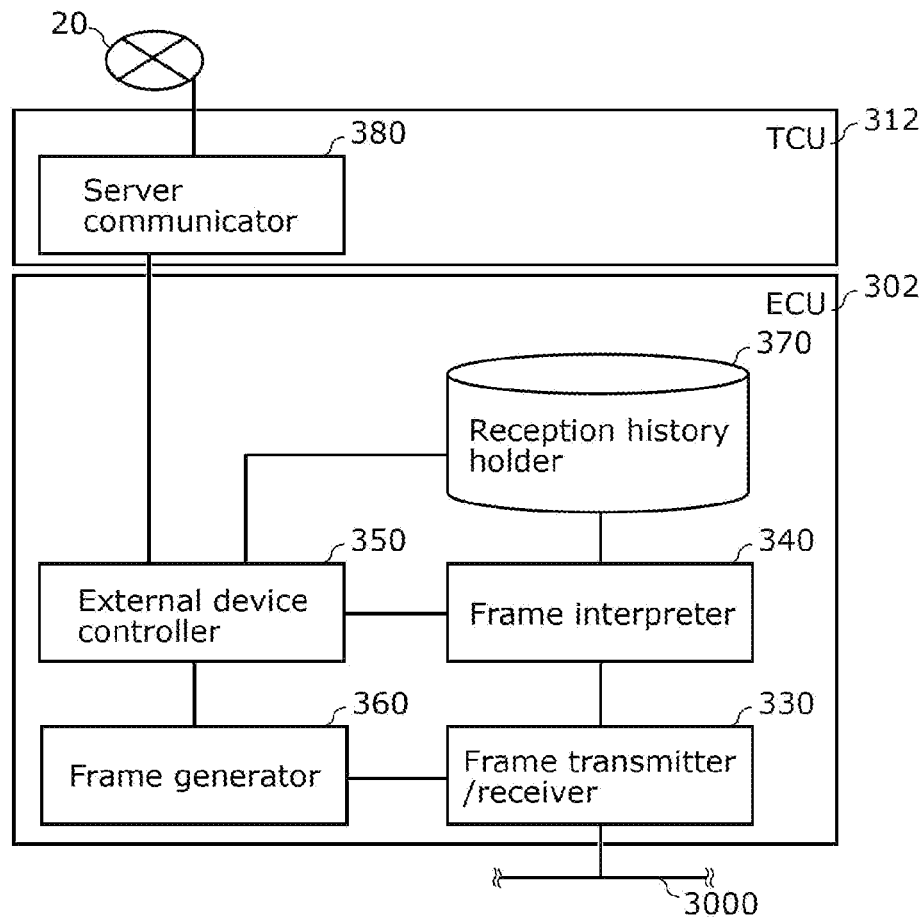
FIG. 8 is a diagram illustrating the functional configuration of an ECU and a telematics control unit included in the aforementioned in-vehicle network system.
FIG. 9 is a diagram illustrating an example of a reception history for frames received by the aforementioned ECU.

FIG. 8 is a diagram illustrating the configuration of ECU 302 and TCU 312. Note that the other ECUs have the same basic configuration as ECU 302, and devices connected to external device controller 350 differ depending on the ECU. As illustrated in FIG. 8, ECU 302 includes frame transmitter/receiver 330, frame interpreter 340, external device controller 350, frame generator 360, and reception history holder 370. The functions of these constituent elements are realized, for example, by a communication circuit, a processor, a digital circuit, or the like that executes a control program stored in memory, and the like.

Frame transmitter/receiver 330 is connected to bus 3000, and communicates a data frame received from bus 3000 to frame interpreter 340.

Frame interpreter 340 interprets the data frame communicated from frame transmitter/receiver 330, and in accordance with a result of the interpreting, makes a control notification for an external device to external device controller 350. With ECU 302, the received data frame is temporarily held in reception history holder 370 as reception history. This reception history is uploaded, as an in-vehicle network log, to anomaly detection server 60 at predetermined intervals via TCU 312.

External device controller 350 has a function for controlling an external device connected to ECU 302, which in the example of FIG. 8 is TCU 312. External device controller 350 also instructs frame generator 360 to generate a frame based on a state of the external device or details of communication with the external device.

Upon receiving the instruction to generate a frame, frame generator 360 generates a frame and requests frame transmitter/receiver 330 to transmit the frame.

Reception history holder 370 holds a history of data frames received from bus 3000 at predetermined intervals, i.e., the reception history. FIG. 9 illustrates an example of the reception history held in reception history holder 370. The reception history will be described in detail later.

TCU 312 includes server communicator 380.

Server communicator 380 communicates with anomaly detection server 60 over network 20. For example, server communicator 380 uploads, to anomaly detection server 60, the reception history received from ECU 302.

1.8 Frame Reception History

FIG. 9 is a diagram illustrating an example of the reception history held in reception history holder 370 of ECU 302. As illustrated in FIG. 9, a frequency distribution of payload values is held in the reception history for each ID of the CAN data frames (see the "CAN ID" column in the drawing).

Specifically, for the data frame having an ID of 0x100, the frequency of a payload value 0x00FF000000000022 is 4, the frequency of a payload value 0x00FF000000000011 is 6, and the frequency of a payload value 0x00FF000000000000 is 10. Additionally, for the data frame having an ID of 0x200, the frequency of a payload value 0xFF00FFFF00000088 is 3, and the frequency of a payload value 0xFF00FFF0000000F0 is 2. Furthermore, for the data frame having an ID of 0x300, the frequency of a payload value 0x5500FF00330011E4 is 3.

Although the reception history illustrated in the example in FIG. 9 is in the form of a frequency distribution that uses an actual measured value of the frequency of the payload value as-is, the form may instead be values normalized for each ID, e.g., relative frequencies. The frequency distribution of payload values may also be held for each of vehicle statuses, such as stopped, traveling, and so on. The reception history held by reception history holder 370 may also be encrypted. The data structure of the reception history is not limited to the example described here. For example, the data may be in a format in which the reception times and payload values of the data frames are arranged in chronological order.

1.9 Configuration of Gateway

Figure 10:
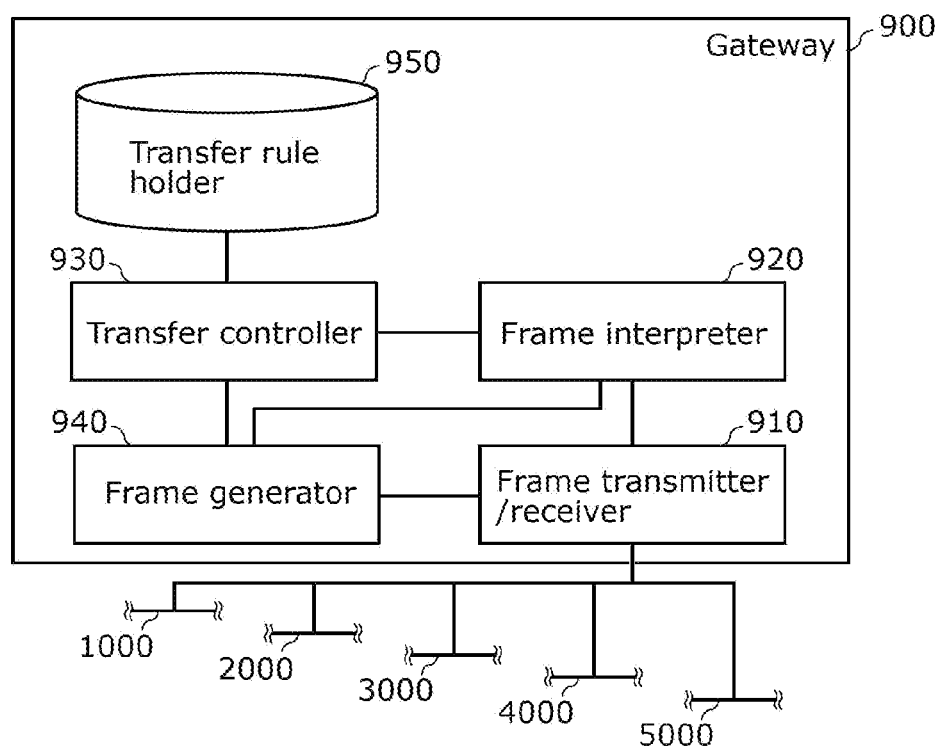
FIG. 10 is a diagram illustrating the configuration of a gateway included in the aforementioned in-vehicle network system.

FIG. 10 illustrates the configuration of gateway 900 in the in-vehicle network system of vehicle 10. As illustrated in FIG. 10, gateway 900 includes frame transmitter/receiver 910, frame interpreter 920, transfer controller 930, frame generator 940, and transfer rule holder 950. The functions of these constituent elements are realized, for example, by a communication circuit, a processor, a digital circuit, or the like that executes a control program stored in memory, and the like.

Frame transmitter/receiver 910 is connected to bus 1000, bus 2000, bus 3000, bus 4000, and bus 5000, and transmits/receives frames to each of the buses according to the CAN protocol. Frame transmitter/receiver 910 receives frames from each bus, one bit at a time, and communicates the frames to frame interpreter 920. Additionally, upon receiving bus information indicating a transfer destination bus and a frame to be transmitted from frame generator 940, frame transmitter/receiver 910 transmits that frame, one bit at a time, to the bus, among bus 1000, bus 2000, bus 3000, bus 4000, and bus 5000, indicated by the bus information.

Frame interpreter 920 interprets the values of the bits constituting the frame received from frame transmitter/receiver 910 so as to map those values to each field in the frame format defined by the CAN protocol. Frame interpreter 920 then communicates information pertaining to the received data frame to transfer controller 930. If it is determined that the received frame is not in the CAN protocol, frame interpreter 920 notifies frame generator 940 that an error frame is to be transmitted. Additionally, if an error frame has been received, i.e., if a received frame is interpreted to be an error frame on the basis of the values of the bits constituting that frame, frame interpreter 920 discards that frame thereafter, i.e., stops interpreting the frame.

In accordance with transfer rules held by transfer rule holder 950, transfer controller 930 selects a transfer destination bus in accordance with the ID and transfer source bus of the received frame, i.e., the bus that received that frame, and makes a notification to frame generator 940 to request that the bus information indicating the transfer destination bus, as well as the details in the frame to be transferred, e.g., the ID, DLC, data field, and the like communicated from frame interpreter 920, is to be transmitted to the transfer destination bus.

In response to the transmission request from transfer controller 930, frame generator 940 generates a frame for transmission using the frame details communicated from transfer controller 930, and communicates the frame for transmission and transfer destination information based on the bus information, e.g., an identifier or the like of the transfer destination bus, to frame transmitter/receiver 910.

Transfer rule holder 950 holds transfer rule information indicating rules for transferring frames, for each of the buses. For example, the transfer rule information indicates, for each bus serving as a transfer source, the correspondence between the ID of the data frame to be transferred, which has been received from that bus, the transfer destination bus, and the ID of the data frame at the transfer destination.

1.10 Sequence of Processing Between Vehicle and Anomaly Detection Server

Figure 11:
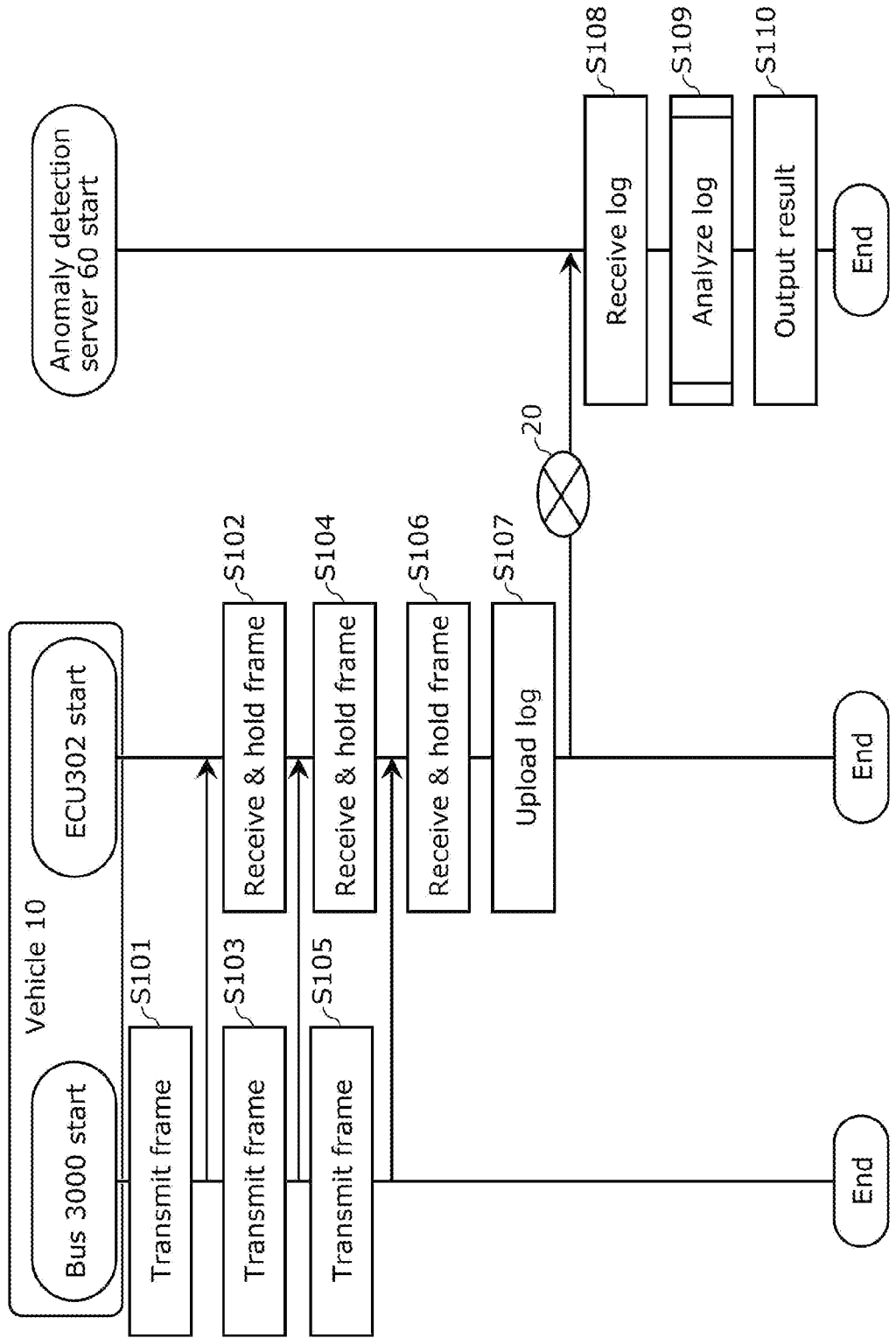
FIG. 11 is a diagram illustrating an example of a processing sequence executed by the aforementioned in-vehicle network anomaly detection system, which includes a vehicle and the anomaly detection server.

FIG. 11 is a diagram illustrating an example of a processing sequence in the in-vehicle network anomaly detection system including anomaly detection server 60 and vehicle 10. To provide more detail, FIG. 10 illustrates an example of processing in which an in-vehicle network log, which includes information pertaining to the payloads of data frames transmitted/received by the CAN buses in the in-vehicle network system included in vehicle 10, is transmitted to anomaly detection server 60, and anomaly detection server 60 analyzes that log. Specifically, FIG. 10 illustrates an example of processing performed when ECU 302 of vehicle 10 has received a data frame transmitted to bus 3000.

When one of the ECUs connected to bus 3000 in the in-vehicle network of vehicle 10 (camera ECU 300, car navigation system ECU 301, or gateway 900) transmits a CAN data frame to bus 3000, the data frame flows in bus 3000 (steps S101, S103, and S105).

ECU 302 of vehicle 10 receives the data frames transmitted to bus 3000 in steps S101, S103, and S105, and holds a reception history of the collection of received data frames (see the example in FIG. 9) (steps S102, S104, and S106).

Once a predetermined period has elapsed, ECU 302 uploads the in-vehicle network log (denoted as "log" in the drawing), which includes information pertaining to a distribution of the payloads of the received data frames, from TCU 312 to anomaly detection server 60 over network 20 (step S107).

Anomaly detection server 60 receives, from vehicle 10, the in-vehicle network log transmitted from vehicle 10 (step S108).

Then, using the received in-vehicle network log and the normal model stored in anomaly detection server 60 (see the example in FIG. 5), anomaly detection server 60 analyzes the in-vehicle network log (step S109).

Finally, anomaly detection server 60 outputs a result of analyzing the in-vehicle network log (step S110).

1.11 In-Vehicle Network Log Analysis Processing by Anomaly Detection Server

Figure 12:
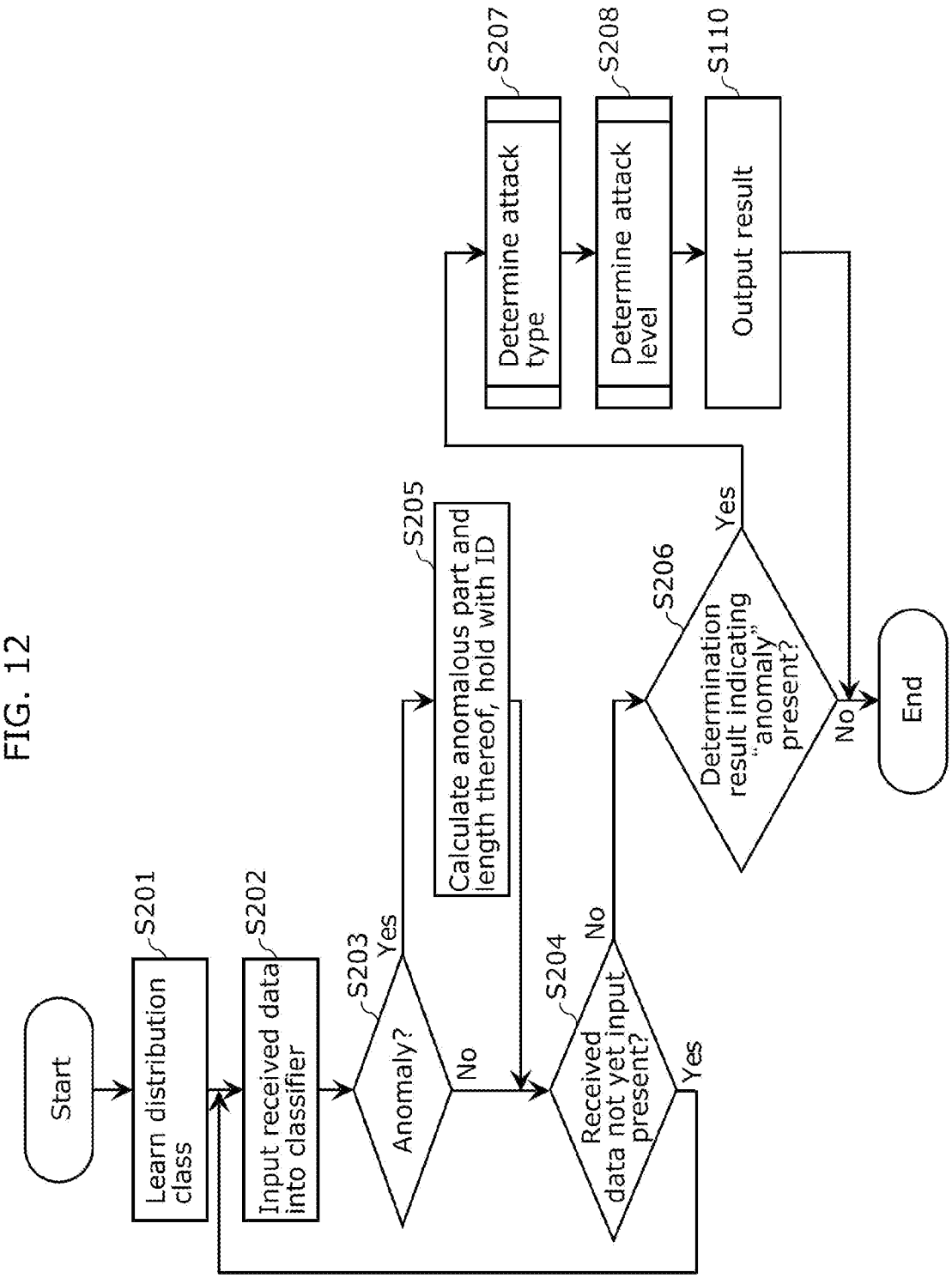
FIG. 12 is a flowchart illustrating an example of a sequence of processing for analyzing a log in the aforementioned anomaly detection server.

FIG. 12 is a flowchart illustrating an example of a sequence of processing for analyzing the in-vehicle network log received from vehicle 10, executed by anomaly detection server 60. The processing for analyzing log information of vehicle 10 will be described hereinafter based on this flowchart.

Using the in-vehicle network log uploaded from vehicle 10, i.e., the log containing information pertaining to the distribution of payloads in the data frames transmitted and received in the in-vehicle network system of vehicle 10, and the normal data distribution model held in reference model holder 670 of anomaly detection server 60, anomaly detection server 60 trains a classifier to classify data observed for the purpose of detecting an anomaly (the observation data) and the normal data (step S201).

Next, anomaly detection server 60 inputs the payload in each data frame (also called "received data" hereinafter) contained in the in-vehicle network log uploaded from vehicle 10 for anomaly detection processing into the classifier trained in step S201 (step S202).

Note that the in-vehicle network log uploaded from vehicle 10 in step S202 is based on a collection of data frames transmitted and received in the in-vehicle network system and obtained to be observed for the purpose of actual anomaly detection (observation data). However, the in-vehicle network log uploaded from vehicle 10 in step S201 is based on data frames transmitted and received in the in-vehicle network system on a different occasion from the observation data based on the in-vehicle network log uploaded in step S202, and is used as training data for training the classifier.

If, as a result of inputting the received data into the classifier, the received data has a score belonging to the observation data that is at least a predetermined value (or a score belonging to the normal data that is less than a predetermined value), i.e., it is determined that (the data frame corresponding to) the received data is anomalous (Yes in step S203), anomaly detection server 60 executes step S205. However, if the received data is not anomalous (No in step S203), anomaly detection server 60 executes step S204.

For a series of received data to be processed, anomaly detection server 60 confirms whether or not the anomaly determination for the corresponding data frames has ended, i.e., whether or not there is received data which has not yet been input to the classifier (step S204). If there is received data which has not yet been input to the classifier (Yes in step S204), anomaly detection server 60 executes step S202 on the received data not yet input. However, if there is no received data which has not yet been input to the classifier (No in step S204), anomaly detection server 60 executes step S206.

Anomaly detection server 60 calculates the bit position of the part indicating the feature amount contributing to the anomaly (the anomalous part), and the bit length of the anomalous part (the anomalous part length), in the payload in the data frame corresponding to the received data determined to be anomalous, and holds those items along with the ID and the payload data (step S205).

Anomaly detection server 60 confirms whether there is a data frame determined to be anomalous for the in-vehicle network log uploaded from vehicle 10 (step S206). If there is a data frame determined to be anomalous (Yes in step S206), anomaly detection server 60 executes step S207, whereas if there is no received data determined to be anomalous (No in step S206), anomaly detection server 60 ends the processing.

Anomaly detection server 60 refers to the attack type determination table stored in attack type determination table 680, and for each data frame determined to be anomalous, determines the attack type from the anomalous part length (step S207). The processing of step S207 will be described in detail later with reference to FIG. 13.

Next, anomaly detection server 60 determines the attack level from the combination of the number of types of IDs of the data frames determined to be anomalous, the position of the anomalous part in the payload, and the attack type (step S208). The processing of step S208 will be described in detail later with reference to FIG. 14.

Finally, anomaly detection server 60 outputs a result of the determination (corresponding to step S110 in FIG. 11), and ends the processing.

1.12 Attack Type Determination Processing by Anomaly Detection Server

Figure 13:
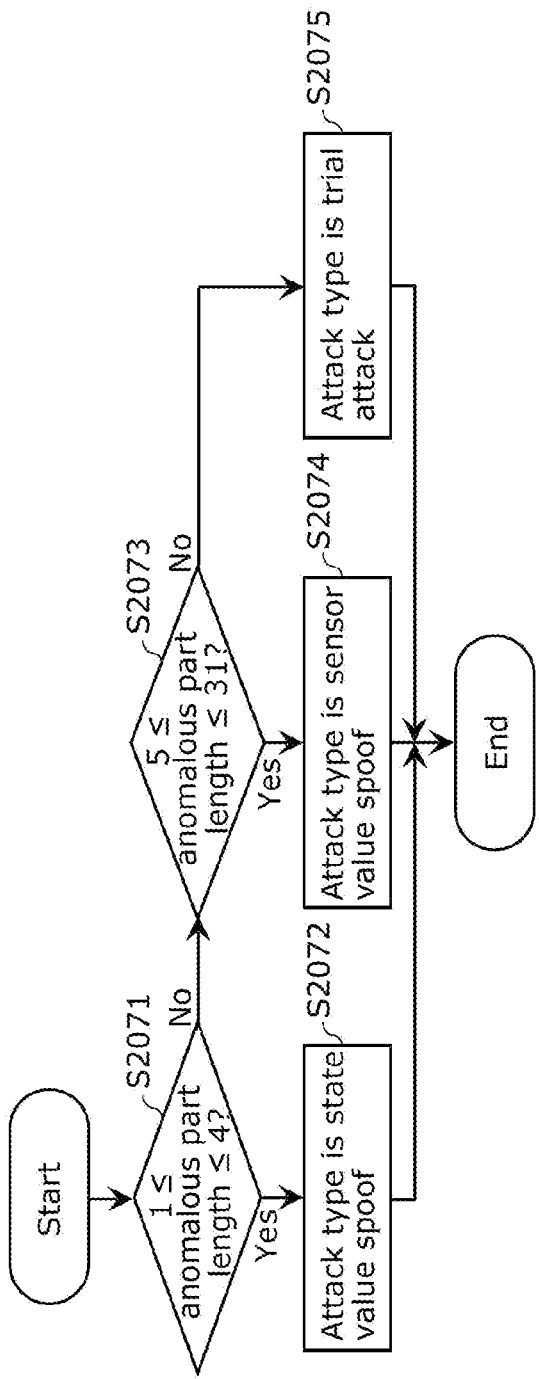
FIG. 13 is a flowchart illustrating an example of a sequence of processing for determining an attack type in the aforementioned anomaly detection server.

FIG. 13 is a flowchart illustrating an example of a sequence of processing for determining the attack type in anomaly detection server 60. This exemplary sequence corresponds to details of step S207 in the processing for analyzing the in-vehicle network log, indicated in FIG. 12.

Anomaly detection server 60 confirms whether or not the anomalous part length of the data frame determined to be anomalous is between 1 bit and 4 bits inclusive (step S2071). If the anomalous part length is between 1 bit and 4 bits inclusive (Yes in step S2071), anomaly detection server 60 determines that the attack type is state value spoofing (step S2072). However, if the anomalous part length is not between 1 bit and 4 bits inclusive (No in step S2071), anomaly detection server 60 confirms whether or not the anomalous part length is between 5 bits and 31 bits inclusive (step S2073). If the anomalous part length is between 5 bits and 31 bits inclusive (Yes in step S2073), anomaly detection server 60 determines that the attack type is sensor value spoofing (step S2074). If the anomalous part length is not between 5 bits and 31 bits inclusive (No in step S2073), i.e., if the anomalous part length is at least 32 bits, anomaly detection server 60 determines that the attack type is trial attack (step S2075).

Anomaly detection server 60 performs the above-described processing until there are no more data frames which have been determined to be anomalous but for which the attack type has not yet been determined.

1.13 Attack Level Determination Processing by Anomaly Detection Server

Figure 14:
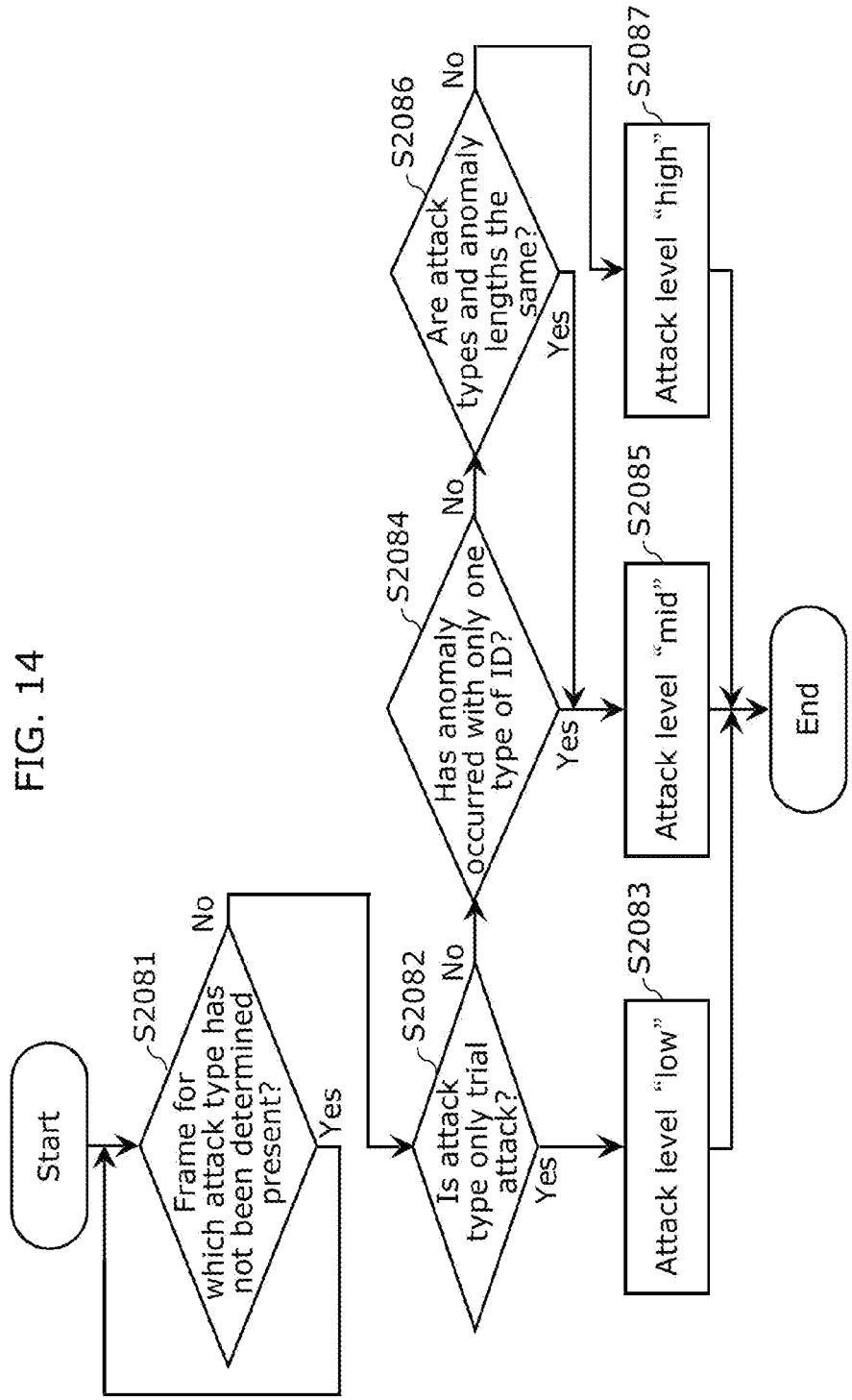
FIG. 14 is a flowchart illustrating an example of a sequence of processing for determining an attack level in the aforementioned anomaly detection server.

FIG. 14 is a flowchart illustrating an example of a sequence of processing for determining the attack level in anomaly detection server 60. This exemplary sequence corresponds to details of step S208 in the processing for analyzing the in-vehicle network log, indicated in FIG. 12.

Anomaly detection server 60 confirms whether or not there is a data frame for which the attack type has not yet been determined (step S2081). If there is a data frame for which the attack type has not yet been determined (Yes in step S2081), anomaly detection server 60 stands by until there are no data frames for which the attack type has not yet been determined.

If there are no data frames for which the attack type has not yet been determined (No in step S2081), anomaly detection server 60 confirms whether or not the determined attack type is only trial attack (step S2082). If the attack type is only trial attack (Yes in step S2082), anomaly detection server 60 determines that the attack level is "low" (step S2083).

If the attack type is not only trial attack (No in step S2082), anomaly detection server 60 confirms whether or not there is only one type of ID for the data frame determined to be anomalous (step S2084). If there is only one type of ID for the data frame determined to be anomalous (Yes in step S2084), anomaly detection server 60 determines that the attack level is "mid" (step S2085).

If there is not only one type of ID for the data frame determined to be anomalous, i.e., there are a plurality (No in step S2084), anomaly detection server 60 confirms whether or not the attack type determined in step S207, as well as the anomalous part, are the same among the data frames having the different IDs (step S2086). If both the attack type and the attack location are the same (Yes in step S2086), anomaly detection server 60 determines that the attack level is "mid" (step S2085). If not (No in step S2086), anomaly detection server 60 determines that the attack level is "high" (step S2087).

1.14 Effects of the Embodiment

With the in-vehicle network anomaly detection system according to the present embodiment, anomaly detection server 60 obtains, from vehicle 10, information pertaining to a distribution of payload values in frames transmitted and received in the in-vehicle network system, and an anomalous data frame is detected by comparing that distribution with a distribution of payload values in normal data frames held by anomaly detection server 60. This enables anomaly detection server 60 to find changes in the distribution of the payload values within a predetermined period of observation for anomaly detection. Thus even if the payload in a data frame has been injected with a payload value within a normal range, as opposed to an outlier, in an attack, the data frame will be detected as anomalous based on the stated change. This anomaly detection server 60 has a high accuracy for detecting anomalous data frames, and can therefore increase the security of the in-vehicle network system.

Furthermore, for the data frame determined to be anomalous, anomaly detection server 60 calculates the anomaly contribution level indicating which of the plurality of feature amounts corresponding to different parts in the payload in the data frame contributes to the anomaly. This makes it possible not only to detect anomalous data frames, but also to understand the anomalous payload part of the data frames, which makes it easier to understand the details of the attack.

Furthermore, anomaly detection server 60 determines the type of attack that produced the anomaly based on the length of the anomalous payload part (the anomalous part length) of the data frame determined to be anomalous. This makes it possible to determine which sub-fields in the payload are being spoofed, and to understand the details of the attack more abstractly, which leads to a faster and more appropriate response to the anomaly.

Furthermore, anomaly detection server 60 determines the attack level, which indicates the danger level, based on conditions pertaining to the attack type, which is found from the ID indicating the type of the data frame determined to be anomalous, the anomalous payload part, and the anomalous part length. This makes it possible to prioritize responses to attacks having a high danger level, such as attacks involving improper control of vehicles, which makes it possible to preemptively reduce the risk of an accident.

Variations and Supplemental Descriptions

Although an anomaly detection method or an anomaly detection device according to one or more aspects has been described thus far based on the embodiment, the anomaly detection method and the anomaly detection device according to the present disclosure are not intended to be limited to the embodiment. Embodiments implemented by combining constituent elements from different other embodiments and variations on the embodiments conceived by one skilled in the art may be included in the scope of one or more aspects as well, as long as they do not depart from the essential spirit of the present disclosure. Such variations on the foregoing embodiment, as well as supplements to the descriptions provided in the foregoing embodiment, will be described hereinafter.

(1) Although the foregoing embodiment describes the in-vehicle network system as being based on the CAN protocol, the communication network system to which the anomaly detection method and the anomaly detection device according to the present disclosure can be applied is not limited thereto. The in-vehicle network system may be compliant with another standard, such as CAN-FD (CAN with Flexible Data rate), Ethernet (registered trademark), LIN (Local Interconnect Network), or FlexRay (registered trademark). The in-vehicle network system may have a combination of a plurality of networks that each complies with one of the stated standards. Furthermore, although the foregoing embodiment describes the anomaly detection method and the anomaly detection device according to the present disclosure as a security countermeasure technique applied in an in-vehicle network system installed in an automobile, the scope of application is not limited thereto. The anomaly detection method and the anomaly detection device according to the present disclosure are not limited to automobiles, and may also be applied in a communication network system for a mobility device such as a construction machine, an agricultural machine, a ship, a train, an aircraft, a drone, and the like. These may also be applied in a communication network system used in an industrial control system in a facility such as a factory or a building, and to a communication network system for controlling an embedded device.

(2) Although the foregoing embodiment describes the cause of the detected anomaly as being an attack on the communication network system, and the type of the attack being determined, the cause of the anomaly detected by the anomaly detection method and the anomaly detection device according to the present disclosure is not limited to an attack. For example, an anomaly type caused by a malfunction, damage, or defect in various types of devices connected to the communication network, or by an external factor (e.g., temperature, humidity, or external noise), may be determined. The attack type determined by attack type determiner 640 in the foregoing embodiment can be said to be one example of such anomaly types. These conditions pertaining to the anomaly type, not limited to attacks, may also be used to determine the anomaly level indicating the danger level. The attack level determined by attack level determiner 650 in the foregoing embodiment can be said to be one example of this anomaly level.

(3) Although the server performs the anomaly detection processing in the foregoing embodiment, the processing may be executed locally, within the communication network system of the vehicle or the like. For example, the processing may be performed by a GPU (Graphics Processing Unit) of a head unit constituting the in-vehicle network system. This makes it possible to increase the immediacy of the anomaly detection compared to when the processing is performed by the server. In this case, the server may aggregate the results of anomaly detection processing executed locally, such as by each vehicle. Additionally, the reference model used locally at this time may be held in advance in a storage device in the local communication network system, or may be downloaded from a server as appropriate. Additionally, the anomaly detection processing may be divided between local communication network systems and the server, e.g., with the communication network system executing the processing up to specifying the anomalous part, and the server executing the subsequent determination of the attack type and determination of the attack level.

(4) Although the foregoing embodiment describes the reference model as being held in the anomaly detection server in advance, the reference model need not be held in advance. For example, log information that has been determined to be free of anomalies may be used as a reference model indicating the distribution of data when no anomalies have occurred in the next and subsequent anomaly determinations. Additionally, the reference model held in the anomaly detection server may be updated using the in-vehicle network log.

(5) Although the foregoing embodiment does not describe any particular examples of the form of the anomaly detection server, the processing may be executed by a server which is local, i.e., framed in terms of the embodiment described above, a server prepared as an edge server close to the vehicle. Doing so results in a lower impact of network latency than when the anomaly detection processing is handled by a cloud server. For example, the edge server is a roadside device, the roadside device is connected to a cloud server over a network, and the vehicle uploads the in-vehicle network log to the roadside device. The roadside device may execute the anomaly detection processing on the received in-vehicle network log and return the results to the vehicle, and may also upload the results to the cloud server.

(6) Although the foregoing embodiment describes an administrator or security analyst of the in-vehicle network anomaly detection system as being set as the recipient of the information communicated as an alert when an anomaly is detected in the vehicle or server, the configuration is not limited thereto. For example, the information may be provided to the car manufacturer or the ECU supplier, or to an information terminal used by a user of the vehicle, such as the driver or owner. The information may also be provided to a security provider that can be used in common among a plurality of car manufacturers.

(7) Although the foregoing embodiment describes a log of the data frames received by the ECU connected to the TCU being uploaded from the TCU to the anomaly detection server, the form of the upload of the data frames from the vehicle to the anomaly detection server is not limited thereto. For example, a log of data frames received by a gateway that receives data frames from a wider range within an in-vehicle network system may be uploaded to the anomaly detection server. This log information may also be uploaded from the gateway to the anomaly detection server.

(8) Although the foregoing embodiment describes the ECU as periodically uploading a log of the data frame of the in-vehicle network, the occasion or frequency of this uploading is not limited thereto. The in-vehicle network log may, for example, be uploaded in response to a request from the anomaly detection server, or may be uploaded only when an anomaly is detected by an IDS (Intrusion Detection System) installed in the vehicle. Network congestion and the anomaly detection server being overloaded delay the anomaly detection processing, which in turn leads to delays in responses taken based on the results. However, this configuration leads to a reduction in network communication volume and a reduced processing load on the anomaly detection server, which in turn suppresses delays in the response.

(9) Although the foregoing embodiment describes the anomaly detection server as subjecting all data frames indicated by the in-vehicle network log uploaded from the vehicle to the anomaly detection processing, only some data frames may be subjected to the processing instead. For example, only data frames with a specific ID may be subjected to the anomaly detection processing. This reduces the processing load on the anomaly detection server. The IDs of the data frames subject to the processing may also be switched dynamically. This makes it possible for the anomaly detection server to perform the anomaly detection processing on the data frames for all the IDs while reducing the load of the anomaly detection processing, which in turn makes it possible to strike a balance between maintaining safety and avoiding delays in responding to anomalies.

(10) In the foregoing embodiment, although the ECU that uploads the in-vehicle network log uploads the log information based on the payload information of all data frames received in a predetermined period, the log information uploaded to the anomaly detection server does not have to be based on the payload information of all data frames. The uploaded log information may be based on the payload information of a data frame having a specific ID, for example. This configuration leads to a reduction in network communication volume and a reduced processing load on the anomaly detection server. The IDs of the data frames to be uploaded may also be switched dynamically. This makes it possible for the anomaly detection server to perform the anomaly detection processing on the data frames for all the IDs while reducing the load of the anomaly detection processing, which in turn makes it possible to strike a balance between maintaining safety and avoiding delays in responding to anomalies.

(11) Although the foregoing embodiment describes the anomaly detection server as performing the anomaly detection processing by taking all of multidimensional feature amounts corresponding to the payload values of the data frames as an input, the number of dimensions of the input feature amounts may be reduced. For example, when a counter or checksum sub-field included in the payload is known, feature amounts corresponding to those subfields may be excluded from the input for the anomaly detection processing. This makes it possible to reduce the amount of calculations by excluding parts that do not directly affect improper control from the anomaly detection processing, and execute the anomaly detection appropriately.

(12) Although the foregoing embodiment describes the anomaly detection server as classifying the attack types into three types, namely sensor value spoofing, state value spoofing, and trial attack, and the classifications of these attacks are not limited thereto. For example, a classification may be used in which a compound attack of the aforementioned attacks is included in the same data frame. Furthermore, the values of the anomalous part lengths of the payload, used to determine the attack and the other anomaly types in the foregoing embodiment, are merely examples, and are not limited thereto. When a possible range of the anomalous part length in the event of a sensor value anomaly is taken as a first range, a possible range of the anomalous part length in the event of a state value anomaly is taken as a second range, and a possible range of the anomalous part length in the event of an anomaly caused by a trial attack is taken as a third range, it is assumed that the ranges will become longer in order from the first range, the second range, and the third range, and the foregoing example reflects that assumption. Additionally, the first range, the second range, and the third range do not necessarily have to be contiguous. For example, when the upper limit of the first range is 4 bits, the lower limit of the second range need not be 5 bits, and may instead be 8 bits, for example. The upper limit and lower limit of these ranges can be defined as possible values derived based on the design, specifications, compliant standard, and so on of the in-vehicle network system. Additionally, a range of an anomalous part length indicating the occurrence of a compound attack such as that described above may be used as well.

(13) Although the foregoing embodiment describes the anomaly detection server as classifying the attack level as low, mid, or high, the classification method is not limited thereto. A score having more levels may be used instead, for example. The score of the attack level may be calculated using a predetermined calculation formula including parameters based on, for example, the ID in the frame determined to be anomalous, the number of IDs of frames determined to be anomalous (i.e., the number of types of data frames), the attack type, or the anomalous part length and the position of the anomalous part in the payload. This makes it possible to respond to an anomaly according to a more detailed danger level, and to prioritize the analysis more precisely.

(14) Although the foregoing embodiment describes the anomaly detection server as determining the attack type based on the bit length of the anomalous part, i.e., the part of the payload contributing to the anomaly, the method for determining the attack type is not limited thereto. For example, the anomaly contribution level may further be used to determine the attack type. Additionally, the attack type may be determined by inputting an anomaly contribution level, which has been calculated for the payload in the data frame subject to the anomaly detection processing, into an attack type classifier which has been trained with anomaly contribution levels. Additionally, a database having payload sub-field information may be held, and the attack type may be determined by verifying the anomalous part against that database.

(15) Although the foregoing embodiment describes an example in which one reference model is used, the configuration is not limited thereto. For example, in the case of a vehicle, different normal models may be used in accordance with the vehicle model, year, options, in-vehicle network system configuration, and so on.

(16) Although the foregoing embodiment describes the reference model as being a model indicating a distribution of data obtained during normal travel of the vehicle, the details indicated by the reference model are not limited thereto. For example, the reference model may be a model indicating a distribution of data obtained during an anomaly, based on data collected from a communication network system in which an anomaly is known to be occurring.

(17) Although the foregoing embodiment describes the anomaly detection server as determining the attack level based on a combination of conditions pertaining to the number of types of IDs of data frames determined to be anomalous, the determined attack type, and the position of the anomalous part in the payload, the attack level may be determined without using all of these conditions. For example, the attack level may always be determined to be mid when there is only one type of ID determined to be anomalous. This makes it possible to more flexibly calculate the attack level.

(18) Although the foregoing embodiment describes the anomaly detection server as determining that a corresponding frame is anomalous when the density ratio exceeds a predetermined threshold, the predetermined threshold may be a value arising when the density ratio is at a maximum in the feature amounts of the reference model. This reduces the likelihood that a normal frame will be erroneously determined to be anomalous, and leads to a reduction in analysis costs.

(19) Although the foregoing embodiment describes the anomaly detection server as holding a distribution of payload values for each ID as the reference model, a distribution of payload values may be held without separating the values by ID. This makes it possible to effectively reduce the data size of the reference model.

(20) Although the foregoing embodiment describes the vehicle log communicated to the anomaly detection server as information pertaining to CAN frames, the vehicle log communicated to the anomaly detection server is not limited thereto. For example, the frames may be Ethernet frames, CAN-FD frames, or FlexRay frames, and do not have to be in-vehicle network frames. For example, GPS information indicating the current position of the vehicle, a log of accesses to an audio head unit, a log pertaining to operational processes, firmware version information, or the like may be used as well.

(21) Each device in the foregoing embodiments is specifically a computer system constituted by a microprocessor, ROM, RAM, a hard disk unit, a display unit, a keyboard, a mouse, and the like. A computer program is recorded in the RAM or hard disk unit. Each device realizes the functions thereof by the microprocessor operating in accordance with the computer program. Here, the computer program is constituted by a combination of a plurality of command codes that indicate commands made to a computer to achieve a predetermined function.

(22) Some or all of the constituent elements constituting the devices in the foregoing embodiments may be implemented by a single integrated circuit through system LSI (Large-Scale Integration). "System LSI" refers to very-large-scale integration in which multiple constituent elements are integrated on a single chip, and specifically, refers to a computer system configured including a microprocessor, ROM, RAM, and the like. A computer program is recorded in the RAM. The system LSI circuit realizes the functions thereof by the microprocessor operating in accordance with the computer program.

The parts of the constituent elements constituting the foregoing devices may be implemented individually as single chips, or may be implemented with a single chip including some or all of the devices.

Although the term "system LSI" is used here, other names, such as IC, LSI, super LSI, ultra LSI, and so on may be used, depending on the level of integration. Further, the manner in which the circuit integration is achieved is not limited to LSIs, and it is also possible to use a dedicated circuit or a general purpose processor. An FPGA (Field Programmable Gate Array) capable of post-production programming or a reconfigurable processor in which the connections and settings of the circuit cells within the LSI can be reconfigured may be used as well.

Further, if other technologies that improve upon or are derived from semiconductor technology enable integration technology to replace LSI circuits, then naturally it is also possible to integrate the function blocks using that technology. Biotechnology applications are one such foreseeable example.

(23) Some or all of the constituent elements constituting the foregoing devices may be constituted by IC cards or stand-alone modules that can be removed from and mounted in the apparatus. The IC card or module is a computer system constituted by a microprocessor, ROM, RAM, and the like. The IC card or module may include the above very-large-scale integration LSI circuit. The IC card or module realizes the functions thereof by the microprocessor operating in accordance with the computer program. The IC card or module may be tamper-resistant.

(24) The present disclosure may be realized by the methods described above. This may be a computer program that implements these methods on a computer, or a digital signal constituting the computer program.

Additionally, the present disclosure may also be computer programs or digital signals recorded in a computer-readable recording medium such as a flexible disk, a hard disk, a CD-ROM, an MO, a DVD, a DVD-ROM, a DVD-RAM, a BD (Blu-ray (registered trademark) Disc), semiconductor memory, or the like. The constituent elements may also be the digital signals recorded in such a recording medium.

Additionally, the present disclosure may be realized by transmitting the computer program or digital signal via a telecommunication line, a wireless or wired communication line, a network such as the Internet, a data broadcast, or the like.

Additionally, the present disclosure may be a computer system including a microprocessor and memory, where the memory records the above-described computer program and the microprocessor operates in accordance with the computer program.

Additionally, the present disclosure may be implemented by another independent computer system, by recording the program or the digital signal in the recording medium and transferring the recording medium, or by transferring the program or the digital signal over the network or the like.

(25) The above-described embodiments and variations may be combined as well.

INDUSTRIAL APPLICABILITY

According to the present disclosure, in a communication network such as an in-vehicle network system, even when an attacker has transmitted an improper frame that does not contain any outliers, whether or not that frame is anomalous can be determined. Furthermore, an anomalous part in the payload in an anomalous frame is calculated, and details such as the type and level of the anomaly can be quickly understood and responded to based on that anomalous part, which is effective in terms of improving safety.

The invention claimed is:

1. An anomaly detection method that, in a communication network system, determines whether each of frames, which are contained in observation data constituted by a collection of frames transmitted and received over the communication network system and observed in a predetermined period, is anomalous, and outputs an anomalous part of a payload in a frame determined to be anomalous, the anomaly detection method comprising:

obtaining a data distribution of a plurality of feature amounts pertaining to a part of the payload included in the frame, the part being at least one bit;

detecting whether or not the frame contained in the observation data is anomalous; and outputting the anomalous part; and determining an anomaly type, wherein in the obtaining, the data distribution is obtained for a collection of frames that are transmitted and received over the communication network system, the collection being obtained at a different timing from a timing at which the observation data is obtained, in the detecting, a difference between the data distribution obtained in the obtaining and a data distribution of a feature amount extracted from the frame contained in the observation data is calculated, and the frame is determined to be an anomalous frame when the frame has a feature amount for which the difference is at least a predetermined value, in the outputting, when a frame determined to be an anomalous frame in the detecting is present, an anomaly contribution level is calculated for the plurality of feature amounts that have been extracted from the anomalous frame, and an anomalous payload part is output, the anomalous payload part being at least one part in the payload that corresponds to a feature amount for which the anomaly contribution level is at least a predetermined value, and in the determining of the anomaly type, an anomalous payload part length is specified based on the anomalous payload part, and the anomaly type is determined according to the anomalous payload part length.

2. The anomaly detection method according to claim 1, wherein in the determining of the anomaly type, the anomaly type is determined to be a state value anomaly when the anomalous payload part length is within a first range, a sensor value anomaly when the anomalous payload part length is within a second range greater than the first range, and a trial attack anomaly when the anomalous payload part length is within a third range longer than the second range.

3. The anomaly detection method according to claim 2, wherein the first range is a range having an upper limit of no greater than 4 bits, the second range is a range having a lower limit of at least 8 bits and an upper limit of no greater than 16 bits, and the third range is a range having a lower limit of 32 bits.

4. The anomaly detection method according to claim 1, further comprising:

determining an anomaly level, wherein in the determining of the anomaly level, the anomaly level is determined to be higher when a plurality of types of frames have been determined to be anomalous in the detecting and the anomalous payload part output in the outputting differs among the plurality of types of frames than when the anomalous payload part is the same among the plurality of types of frames.

5. The anomaly detection method according to claim 1, further comprising:

determining an anomaly level, wherein in the determining of the anomaly level, the anomaly level is determined to be higher than when a plurality of types of frames have been determined to be anomalous in the detecting and the anomaly type determined in the determining of the anomaly type is the same among the plurality of types of frames.

6. The anomaly detection method according to claim 1, further comprising:

determining an anomaly level, wherein in the determining of the anomaly level, the anomaly level is determined to be lower when at least one type of frame has been determined to be anomalous in the detecting and the anomaly type determined in the determining of the anomaly type is only a trial attack anomaly than when the anomaly type determined does not include the trial attack anomaly.

7. The anomaly detection method according to claim 1, further comprising:

determining an anomaly level, wherein in the determining of the anomaly level, when at least one type of frame has been determined to be anomalous in the detecting, the anomaly level is determined based on a predetermined formula that takes, as a parameter, at least one of the type of the frame determined to be anomalous, a number of types of frames determined to be anomalous, the anomalous payload part output in the outputting, and the anomaly type determined in the determining of the anomaly type.

8. The anomaly detection method according to claim 1, wherein in the determining of the anomaly type, when a plurality of the anomalous payload parts are included in a single frame and a number of intermediate bits between the plurality of the anomalous payload parts is no greater than a predetermined standard, the anomalous payload part and the intermediate bits are collectively treated as a single anomalous payload part.

9. The anomaly detection method according to claim 1, wherein the communication network system is an in-vehicle network system.

10. An anomaly detection device that, in a communication network system, determines whether a frame, which is contained in observation data constituted by a collection of frames transmitted and received over the communication network system and observed in a predetermined period, is anomalous, and outputs an anomalous part of a payload in a frame determined to be anomalous, the anomaly detection device comprising:

a reference model holder that holds a data distribution of a plurality of feature amounts pertaining to a part of the payload included in the frame, the part being at least one bit;

an anomaly detector that determines whether or not the frame contained in the observation data is anomalous;

an anomalous part outputter that, when the anomaly detector has detected an anomalous frame, calculates an anomaly contribution level for the plurality of feature amounts that have been extracted from the anomalous frame, and outputs an anomalous payload part, the anomalous payload part being at least one part contained in the frame and corresponding to a feature amount for which the anomaly contribution level is at least a predetermined value; and a controller that determines an anomaly type, wherein the reference model holder holds the data distribution for a collection of frames that are transmitted and received over the communication network system, the collection being obtained at a different timing from a timing at which the observation data is obtained, the anomaly detector calculates a difference between the data distribution held by the reference model holder and a data distribution of a feature amount extracted from the frame contained in the observation data, and determines that the frame is an anomalous frame when the frame has a feature amount for which the difference is at least a predetermined value, and the controller specifies an anomalous payload part length based on the anomalous payload part, and determines the anomaly type according to the anomalous payload part length.

11. An anomaly detection device that, in a communication network system, determines whether a frame, which is contained in observation data constituted by a collection of frames transmitted and received over the communication network system and observed in a predetermined period, is anomalous, and outputs an anomalous part of a payload in a frame determined to be anomalous, the anomaly detection device comprising:

a processor; and a memory including a control program that, when executed by the processor, causes the processor to perform functions, the functions including:
  obtaining a data distribution of a plurality of feature amounts pertaining to a part of the payload included in the frame, the part being at least one bit;
  detecting whether or not the frame contained in the observation data is anomalous;
  outputting the anomalous part; and
  determining an anomaly type,
wherein in the obtaining, the data distribution is obtained for a collection of frames that are transmitted and received over the communication network system, the collection being obtained at a different timing from a timing at which the observation data is obtained,
in the detecting, a difference between the data distribution obtained in the obtaining and a data distribution of a feature amount extracted from the frame contained in the observation data is calculated, and the frame is determined to be an anomalous frame when the frame has a feature amount for which the difference is at least a predetermined value,
in the outputting, when a frame determined to be an anomalous frame in the detecting is present, an anomaly contribution level is calculated for the plurality of feature amounts that have been extracted from the anomalous frame, and an anomalous payload part is output, the anomalous payload part being at least one part in the payload that corresponds to a feature amount for which the anomaly contribution level is at least a predetermined value, and
in the determining of the anomaly type, an anomalous payload part length is specified based on the anomalous payload part, and the anomaly type is determined according to the anomalous payload part length.

* * * * *